United States Patent
Sergi et al.

(10) Patent No.: US 8,398,753 B2
(45) Date of Patent: Mar. 19, 2013

(54) SYSTEM AND METHOD FOR REMOVING CONTAMINANTS

(75) Inventors: John E. Sergi, Franklin, MA (US); John Gaudreau, Chepachet, RI (US); Oleg P. Kishkovich, Greenville, RI (US); William Goodwin, Medway, MA (US); Devon A. Kinkead, Holliston, MA (US)

(73) Assignee: Entegris, Inc., Billerica, MA (US)

( * ) Notice: Subject to any disclaimer, the term of this patent is extended or adjusted under 35 U.S.C. 154(b) by 623 days.

(21) Appl. No.: 11/628,576

(22) PCT Filed: Jun. 7, 2005

(86) PCT No.: PCT/US2005/020090
§ 371 (c)(1),
(2), (4) Date: Sep. 20, 2007

(87) PCT Pub. No.: WO2006/083290
PCT Pub. Date: Aug. 10, 2006

(65) Prior Publication Data
US 2008/0078289 A1    Apr. 3, 2008

Related U.S. Application Data

(60) Provisional application No. 60/577,723, filed on Jun. 7, 2004, provisional application No. 60/619,857, filed on Oct. 18, 2004.

(51) Int. Cl.
*B01D 46/00* (2006.01)
(52) U.S. Cl. .............................. 95/286; 55/418; 55/484
(58) Field of Classification Search .................... 95/273, 95/286; 55/465, 482, 484, 418
See application file for complete search history.

(56) References Cited

U.S. PATENT DOCUMENTS

| | | | | |
|---|---|---|---|---|
| 3,522,742 | A | 8/1970 | Knab et al. | 73/40.7 |
| 3,780,503 | A | 12/1973 | Smith | 55/418 |
| 3,986,850 | A | 10/1976 | Wilcox | 55/355 |
| 4,462,812 | A * | 7/1984 | Bly et al. | 55/502 |
| 4,666,477 | A | 5/1987 | Lough | 55/276 |

(Continued)

FOREIGN PATENT DOCUMENTS

DE    10153278    5/2003
DE    10153278 A1    5/2003

(Continued)

OTHER PUBLICATIONS

International Search Report for PCT/US2005/020090, dated Jun. 7, 2005.

(Continued)

*Primary Examiner* — Robert Clemente
(74) *Attorney, Agent, or Firm* — Hamilton, Brook, Smith & Reynolds, P.C.

(57) ABSTRACT

The invention provides a system and method comprising an apparatus for removing contaminants from a gas in a semiconductor processing device, which can include a filter unit having at least two parallel filter stages located therein. The filter stages are designed to remove a least a portion of the contaminants present in the gas flowing through them. The apparatus can also include a flow controller for distributing the gas flow among the filter stages. In one embodiment, the controller may consist of a diffuser plate. The invention also provides a sampling tube orifice for gas flow control in a system or method of the invention. In another embodiment, an apparatus for removing contaminants from a gas in a clean room comprises a filter unit having at least two parallel filter stages, which are used to remove a portion of the contaminants in the gas as it passes through the apparatus.

40 Claims, 16 Drawing Sheets

U.S. PATENT DOCUMENTS

| | | | |
|---|---|---|---|
| 5,204,055 | A | 4/1993 | Sachs et al. |
| 5,340,656 | A | 8/1994 | Sachs et al. |
| 5,387,380 | A | 2/1995 | Cima et al. |
| 5,582,865 | A | 12/1996 | Rezuke et al. |
| 5,834,114 | A | 11/1998 | Economy et al. |
| 6,033,573 | A | 3/2000 | Toles et al. |
| 6,096,267 | A | 8/2000 | Kishkovich et al. |
| 6,207,460 | B1 | 3/2001 | Kishkovich et al. |
| 6,293,407 | B1 * | 9/2001 | Bajema ............... 209/495 |
| 6,296,806 | B1 | 10/2001 | Kishkovich et al. |
| 6,740,147 | B2 | 5/2004 | Kishkovich et al. |
| 6,761,753 | B2 | 7/2004 | Kishkovich et al. |
| 6,767,378 | B2 * | 7/2004 | Nishiyama et al. ........ 55/309 |
| 7,014,693 | B2 | 3/2006 | Kishkovich et al. |
| 7,540,901 | B2 | 6/2009 | Kishkovich et al. |
| 2002/0178923 | A1 * | 12/2002 | Kishovich et al. ........ 96/135 |
| 2003/0066795 | A1 * | 4/2003 | Fry et al. ............. 210/411 |
| 2004/0023419 | A1 | 2/2004 | Kishkovich et al. |
| 2004/0166679 | A1 * | 8/2004 | Kishkovich et al. ........ 438/689 |

FOREIGN PATENT DOCUMENTS

| | | |
|---|---|---|
| EP | 2004063621 | 2/2004 |
| JP | 63-2033 A | 6/1976 |
| JP | 2003-533339 A | 11/2003 |
| JP | 2004063621 | 2/2004 |
| JP | 2004-116987 A | 4/2004 |
| WO | WO 01/85308 A2 | 11/2001 |

OTHER PUBLICATIONS

International Preliminary Report on Patentability for PCT/US2005/020090, dated Jun. 7, 2005.

Communication from EPO of Office Action for EP Application No. 05 856 790.0-1213, dated Jan. 28, 2008.

Notification of First Office Action for CN Application No. 200580026690.7, dated Jan. 16, 2009.

Communication from Intellectual Property Office of Singapore of Office Action for SG Application No. 0608462-8, dated Oct. 28, 2009.

Communication from Intellectual Property Office of Singapore of Office Action for SG Application No. 0608462-8, dated Oct. 21, 2008 (recited to correct date).

Communication from Australian Patent Office of Office Action for Singapore Application No. 0608462-8, dated Jun. 17, 2009.

Communication from Australian Patent Office of Second Office Action for Singapore Application No. 0608462-8, dated Jul. 24, 2009, an English translation attached.

Communication from China Patent Office for China Application 200580026690.7, dated Jul. 24, 2009, an English translation attached.

* cited by examiner

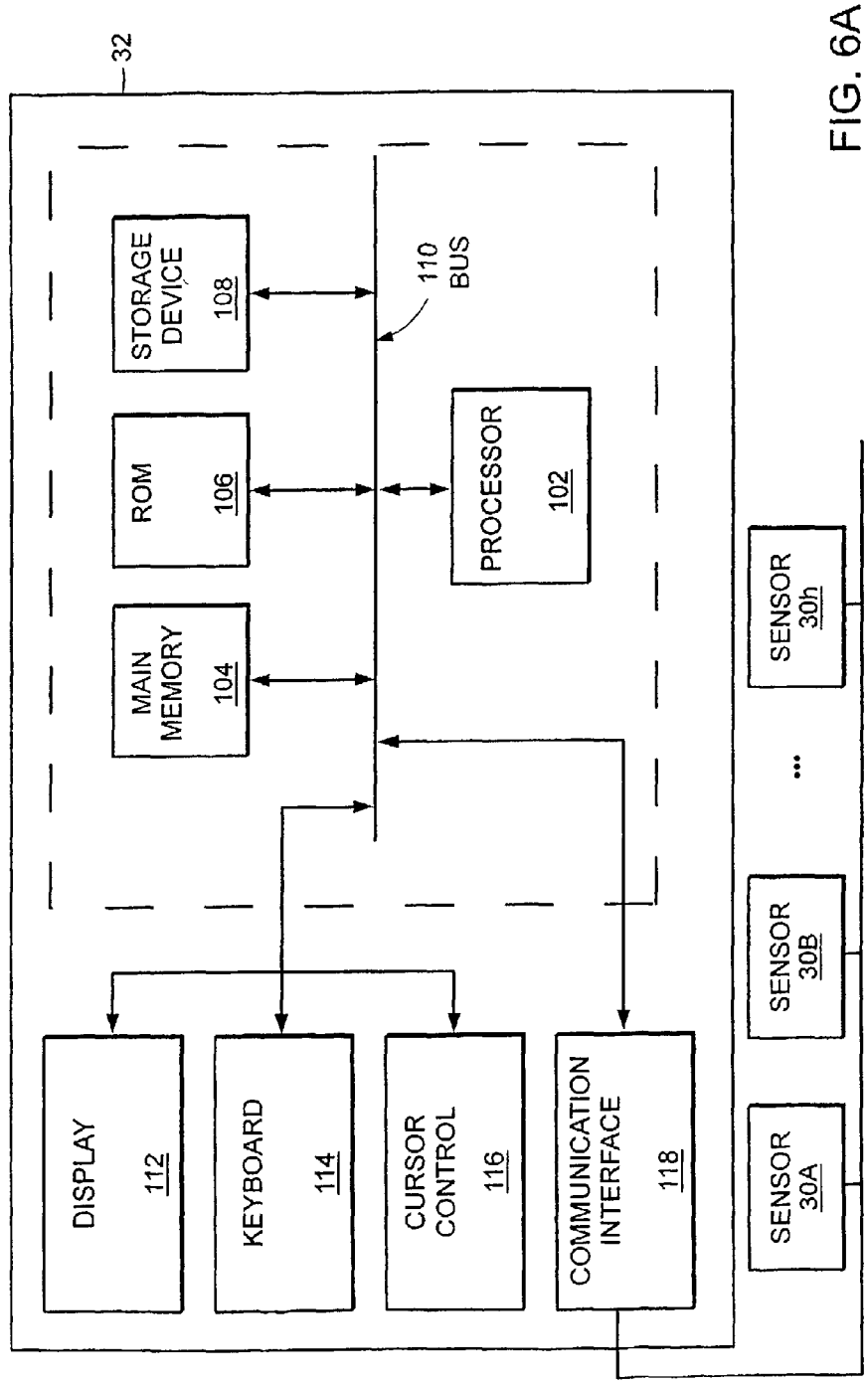

SYSTEM AND METHOD FOR REMOVING CONTAMINANTS

CROSS REFERENCE TO RELATED APPLICATIONS

This application is the U.S. National Stage of International Application No. PCT/US2005/020090, filed Jun. 7, 2005, published in English, which claims the benefit of U.S. Provisional Application No. 60/577,723 filed Jun. 7, 2004 and entitled SYSTEM AND METHOD FOR REMOVING CONTAMINANTS, and U.S. Provisional Application No. 60/619,857 filed Oct. 18, 2004 and entitled, SYSTEM AND METHOD FOR REMOVING CONTAMINANTS, which are hereby incorporated by reference herein.

BACKGROUND OF THE INVENTION

Clean rooms are utilized in many industries for contamination control and to improve product quality and product yields. By way of example, clean rooms may be employed in pharmaceutical, biotechnology and semiconductor applications. Semiconductor manufacturing environments will be used hereinbelow and shall serve as an illustrative environment.

Airborne contaminants must be reduced, eliminated or both to help ensure optimum semiconductor yields. Therefore, gas filtration is critical in semiconductor manufacturing environments. Tremendous efforts are made to eliminate yield-reducing contaminants from the gases used in semiconductor processing tools. Contaminants can generally be classified as either particulate or molecular. Common particulate contaminants include dust, lint, dead skin and manufacturing debris. Examples of yield reducing contaminants include acids, such as, for example, hydrobromic acid, nitric acid, sulfuric acid, phosphoric acid, hydrochloric acid, bases, such as, for example, ammonia, ammonium hydroxide, tetramehtlyammonium hydroxide, trimethylamine, triethylamine, hexamethyldisilazane, N-methylpyrrolidone (NMP), cyclohexylamine, diehtylaminoethanol, methylaamine, dimethylamine, ethanolamine, morpholine, condensables, such as, for example, silicones and hydrocarbons with a boiling point greater than or equal to about 150° C. and dopants, such as, for example, boron, usually as boric acid, phosphorous, usually as organophosphate, and arsenic, usually as an arsenate.

Airborne particulate contaminants may be present in the ambient atmosphere within a clean room or they may be introduced by way of gases injected therein. For example, in semiconductor photolithography tools, gas is supplied for generally two purposes, namely, the actuation of tool pneumatics and the purging of tool optics. Although purified dry air, nitrogen or the like is generally used to drive pneumatics and purge optics, small amounts of contaminants are still liable to be present in the gas at concentrations sufficient to damage tool optics, for example, illuminator optics and projection lenses. Contaminating substances may adhere onto the optical elements to form molecular films. Molecular films on optical surfaces physically absorb and scatter incoming light. Scattered or absorbed light in photolithography optical surfaces causes distortion of the spherical quality of wavefronts. When the information contained in the spherical wavefront is distorted, the resulting image is also misformed or abberated. Image distortions, or in the case of photolithography, the inability to accurately reproduce the circuit pattern on the reticle, cause a loss of critical dimension control and process yield.

Contaminating substances may also chemically react with the optical surfaces of the photolithography tool, the wafer being processed in the tool or both. For example, sulfur dioxide may combine with water in the tool to produce sulfuric acid, which can irreversibly damage tool optics. In addition, ammonia may react with wafer surface materials such as the resist, gate-insulating films and the like. Such a reaction can interfere with the photolithography processing step and reduce process yields. Thus, the purity of the gases supplied to semiconductor processing tools is of critical concern.

The quality of gas flow and such yield-reducing contaminants in a clean room are often monitored through several sampling ports, for example, for one or more semiconductor processing tools. Typically, these sampling ports are used so as to ensure that a clean fabrication environment is being maintained and that semiconductor yields are not affected by an increased contaminant(s) level. Deviations in gas flow quality can also significantly affect semiconductor yields. Contaminants and variable gas flows may also increase maintenance and operational costs. Typical sampling ports for monitoring gas flow quality tend to plug during, for example, wafer fabrication, which can hinder process control and quality assurance efforts. Opening a sampling port during fabrication can also cause detrimental changes in pressure.

Conventional ports also require a substantial time period for sampling to occur as ports are commonly purged for several minutes to expel any residual contaminants that may affect quality measurements. Additionally, the gas flow rate through such ports often varies during sampling, which poses problems with sample uniformity and accuracy. In order to improve semiconductor yields and monitor yield-reducing contaminants, it is necessary to be able to conveniently sample gas flows without any of the aforementioned shortcomings of conventional ports. It is also necessary to be able to reduce and/or eliminate such contaminants. A convenient means for gas flow sampling and reducing or eliminating yield-reducing contaminants should also be easily adaptable to already existing semiconductor tools, clean rooms and their associated sampling ports. It may also be useful to continuously remove yield-reducing contaminants and monitor gas flow quality for such contaminants.

SUMMARY OF THE INVENTION

Embodiments of the invention may be used to filter an incoming air supply to remove airborne contaminants. Moreover, embodiments of the invention may be used to monitor gas flow quality for the removal of contaminants such as, for example, be yield-reducing contaminants. Parallel filter stages are employed to provide highly efficient filtering as well as to provide longer time periods between filter changes. Embodiments of the invention employ a flow controller for distributing an incoming air supply to the plurality of parallel filter stages. This flow controller receives an incoming air supply on its input side and provides a diffused air stream at the flow controller output. The diffused air stream is configured so that each filter bank receives an equal portion of the diffused air stream and further that each filter bank has essentially the same air velocity flowing therethrough.

In accordance with an aspect of the invention, the system and method of the present invention include an apparatus for removing contaminants from a gas in a semiconductor processing device. The apparatus includes a filter unit having at least two parallel filter stages located therein. The filter stages are designed to remove a least a portion of the contaminants present in the gas flowing through them. The apparatus also includes a flow controller for distributing the gas flow among the filter stages. In a preferred embodiment, the flow controller can comprise of a diffuser plate. The diffuser plate includes holes disposed across its surface and configured in a manner that causes each filter stage to receive a uniform and equal portion of the gas present at the input face of the diffuser plate. The apparatus can further be configured to include sensors for measuring, among other things, contaminants present at the input to the filter unit, contaminants present in the filter stages of the unit and contaminants present at the output of the filter stages. The size of the holes and the spacing thereof can be determined by a software program in which the gas flow characteristics such as flow rate, and the number and size of the parallel stages can be selected and used by the program to provide a more optimal design of the diffuser for a given application.

In accordance with another aspect of the invention, an apparatus for removing contaminants from a gas in a clean room is provided. The apparatus includes a filter unit having at least two parallel filter stages, which are used to remove at least a portion of the contaminants in the gas as it passes through the apparatus. The apparatus further includes a diffuser plate having an input face for receiving the gas and an output face for making the gas available to the filter stages. The diffuser plate is mounted within the filter unit in a manner causing it to deliver substantially equal volumes of gas to each filter stage present therein. In addition, the apparatus also includes a number of sampling ports for taking samples representative of the gas volume passing through each filter stage. Data obtained by way of sensors can be used to monitor performance of the apparatus and to predict when filter modules, which make up the filter stages, should be changed.

In accordance with another aspect of the invention, a sampling tube port on the filter housing having an aperture with a first diameter and a second diameter that is smaller than the first diameter to provide a continuous outflow of gas when the sampling tube is not in use. The filter housing typically has a positive pressure internally such that a sampling port will undergo an outflow of gas. The reduced diameter of the aperture is sized to provide a continuous outflow of gas when the sampling port is not in use so as to minimize or eliminate the presence of any contaminants residing at the sampling port while at the same time having a minimal impact on the flow of gas through the filter assembly. The filter housing can typically have a pressure of 1 to 12 inches of water. The aperture can have the form of a conical orifice with an outflow rate of between 10 and 100 cc/minute. The orifice can be used with, for example, sampling ports for a multistage filter system for removing contaminants from a gas in a semiconductor processing device.

In one embodiment, a tube orifice can be used with, for example, an apparatus of the invention for removing contaminants from a gas in a clean room. Exemplary sampling ports can be used for monitoring gas flow quality and to, for example, monitor yield-reducing contaminants and contaminant levels. Preferably, a sampling tube orifice of the invention includes a body portion having an aperture that is longitudinally disposed through the portion. The aperture of the sampling tube orifice features a substantially frustoconical and cylindrical portion.

The frustoconical and cylindrical portions define at least a first and second diameter of the aperture. The aperture can communicate with, for example, one or more apparatuses of the invention such that gas flows therein enter the aperture. The gas then flows through the aperture until it exits the tube orifice. The sampling tube orifice can be replaced with a sampling tube that permits the quality of gas flow in an apparatus of the invention to be easily monitored without affecting the pressure within such an apparatus. The quality of gas flow can be monitored, for example, for yield-reducing contaminants and contaminant levels.

In another embodiment of the sampling tube orifice, the tube orifice comprises a transition portion that communicates between the cylindrical portion and a cylindrical segment of the frustoconical portion. The transition portion may define at least a third diameter of the aperture. The orifice can also include a portion that defines at least a fourth aperture diameter. The sampling portion can also be used to withdraw gas samples from the aperture of the tube orifice. The sampling tube orifice can be disposed in any embodiment as described herein and, preferably, a sampling port of an apparatus of the invention in which the tube orifice is held in place by a retaining member such as a ring that communicates with the port.

A sampling tube orifice of the invention may be composed of any suitable material that can withstand the heat caused by the gas flow and processing or fabrication conditions. An exemplary material can be precisely machined to avoid unwanted protuberances, which can disturb and affect gas flow and, subsequently, gas flow. For example, the sampling tube orifice of the invention may be substantially composed of sapphire. An orifice can also be composed of several different types of materials so as to form a composite. The composition of a tube orifice of the invention is preferably resistant to potential etchants within the gas flow. Such etchants can, for example, be yield-reducing contaminants.

A tube orifice is fabricated so as to allow a continuous and uniform gas flow from an apparatus of the invention without the flow interfering with semiconductor fabrication or yields. By having a continuous and uniform gas flow, sampling from a tube orifice can reduce sample variation and avoid the need for any type of time consuming gas purging when, for example, monitoring yield-reducing contaminants and contaminant levels. Additionally, a continuous gas flow through the tube orifice prevents the opportunity for plugging, which can often interfere with process control and quality assurance efforts, such as, for example, relating to minimizing yield-reducing contaminants and contaminant levels, when using the sampling ports. A tube orifice of the invention is effective for monitoring gas flow quality as it is provides for a low gas flow volume at a uniformly high velocity without affecting detrimental process pressure changes.

For example, a sampling tube orifice of the invention can be used with a filter unit having a plurality of parallel filter stages located within the filter unit for removing at least a portion of the contaminants from the gas flowing therethrough. Optionally, the apparatus can include a flow controller for distributing the gas flow through the parallel filter stages. In another embodiment, a sampling tube orifice can communicate with an apparatus that, for example, comprises a filter unit having a plurality of parallel filter stages located therein for removing at least a portion of the contaminants from a gas passing therethrough. Preferably, the apparatus comprises a diffuser plate having an input face for receiving the gas and an output face for delivering the gas to the plurality of filter stages. Moreover, the diffuser plate can be mounted within the filter unit and configured to deliver substantially equal volumes of the gas to each member of the plurality of filter stages.

In accordance with still another aspect of the invention, a method for removing contaminants from a gas in a semiconductor processing device through the use of a filter unit is provided. An input gas volume is received by the filter unit. The gas is then passed through a flow controller. After passing through the flow controller, the gas is made available to a number of filter stages located within the filter unit. A portion of the gas is passed through each filter stage to remove at least a portion of the contaminants present in the gas. The invention also provides a method for monitoring gas flow quality for, for example, yield-reducing contaminants and contaminant levels via a sampling tube orifice.

In accordance with yet another aspect of the present invention, a computer readable medium having machine-executable instructions disposed thereon is provided. The machine-executable instructions cause a processor to perform a method for monitoring a gas passing through a filter unit containing a number of filter stages operating therein. The computer-readable medium contains instructions for performing the steps of monitoring a gas volume passing through one of the filter stages to produce a monitored gas volume, processing a sample from the monitored gas volume to produce a processed sample, evaluating the processed sample to determine if the monitored filter stage is operating properly according to a defined criteria and sending a notification if the monitored filter stage is not operating according to the defined criteria.

The foregoing and other features and advantages of, for example, the system and method for removing contaminants from a gas using parallel filter stages will be apparent from the following more particular description of preferred embodiments of the system and method as illustrated in the accompanying drawings in which like reference characters refer to the same parts throughout the different views.

DESCRIPTION OF THE DRAWINGS

Other features and advantages of the present invention will be apparent from the detailed description of the invention that follows herein, taken in conjunction with the accompanying drawings of which:

FIGS. 5A-I illustrate several embodiments of filter modules operating in conjunction with types of filtering media and supporting means;

FIG. 6A illustrates a schematic representation of a controller coupled to a plurality of sensors used for monitoring the performance of filter modules within a filter system in accordance with aspects of the invention;

DETAILED DESCRIPTION OF THE INVENTION

Embodiments of the invention may be employed for reducing, eliminating or reducing and eliminating fluid borne contaminants in environments where essentially contaminant-free fluid is desired. Herein, by way of example, the fluid will be a gas and, more particularly, air within a clean room used in semiconductor fabrication or manufacturing. Embodiments of the invention may be used for filtering ambient air within a clean room or may be used for filtering other gas flows directed to or used within a confined area such as, for example, for reducing contaminant buildup on photolithographic equipment using high velocity air streams.

Preferred embodiments of the invention will be described herein in connection with clean room environments; however, the invention is not limited thereto by way of configuration, application, size and so forth. Alternative embodiments and uses of the invention will become readily apparent from the detailed description and drawings herein.

Figure 1:
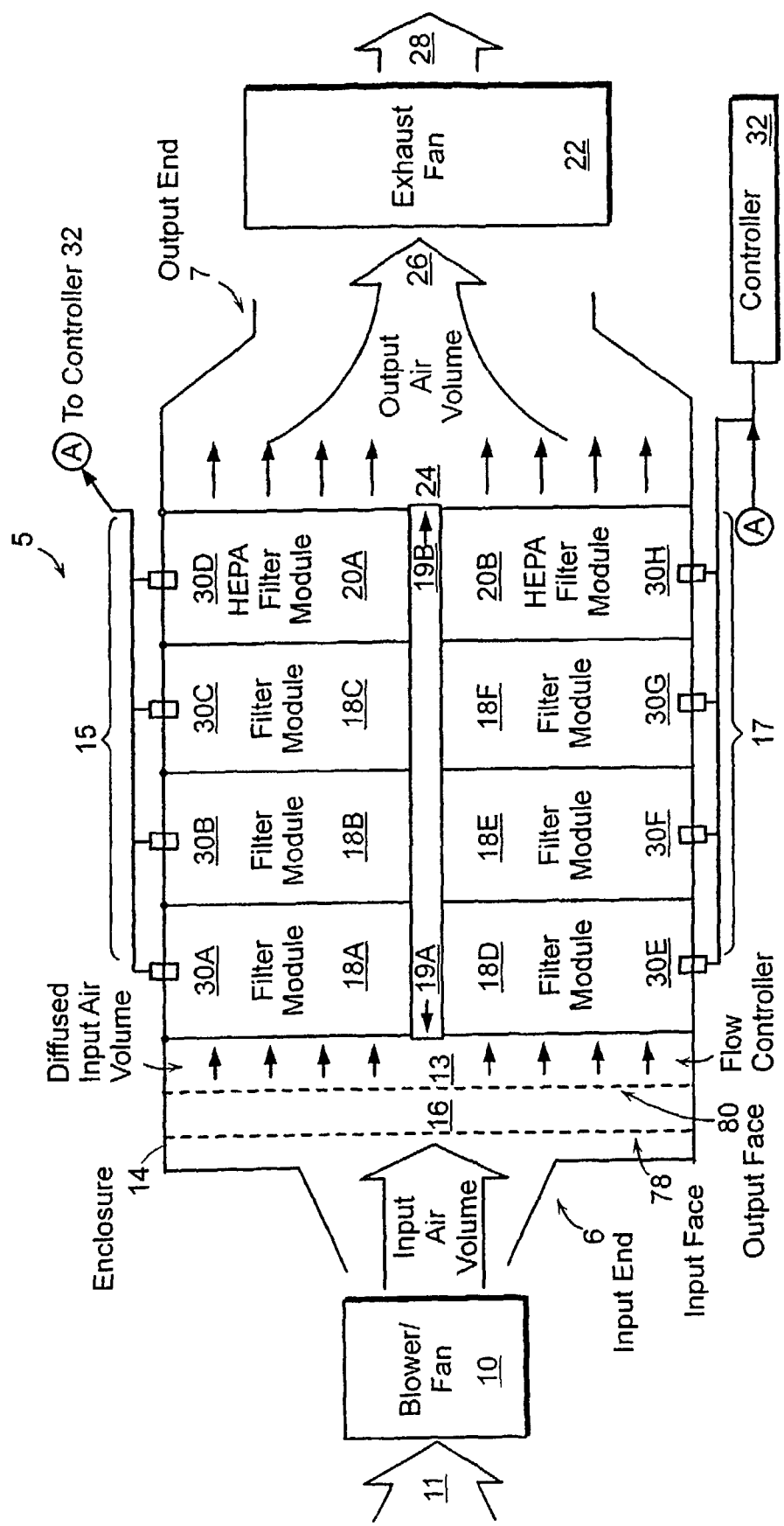
FIG. 1 is a schematic representation of a filter system in accordance with aspects of the invention.

FIG. 1 illustrates a schematic representation of a filter system in accordance with aspects of the invention. Filter system 5 may be include, among other things, an enclosure 14, flow controller 16, one or more replaceable filter modules 18A-18F, generally filter 18, one or more high efficiency particulate air (HEPA) filter modules 20A and 20B, generally HEPA filter 20, and seal 19A and 19B. Filter system 5 may also include a blower/fan unit 10 and/or an exhaust fan 22. Filter system 5 is normally coupled to air handling apparatuses such as plenums or duct work. The air handling apparatuses serve to focus one or more volumes of air going into input end 6 or coming out of output end 7.

A plenum may direct an air volume 11 into a blower fan 10 before forming an input air volume 12 entering enclosure 14 at the input end 6. The blower/fan 10 is electromechanically, mechanically or pneumatically powered to increase the velocity of an input air volume 12. Enclosure 14 may be comprised of a plurality of panels made of essentially gas-impermeable materials such as, for example, aluminum, cold rolled steel, plastic, composite and so forth. Enclosure 14 forms the outer structure of filter system 5. Typically, enclosure 14, also referred to as a filter unit, will have a front panel opposedly mounted to a rear panel and a first side panel opposedly mounted to a second side panel. The side panels sealably mate with the front and rear panels to form an enclosed volume into which flow controller 16, filters 18 and HEPA filters 20 are installed. The overall volume of system 5 is generally less than 80 cubic feet (cu. ft.) and, in a preferred embodiment, is on the order of 65 cu. ft. and has overall dimensions of 72.5" high×33" wide×47.25" wide. A top panel and bottom panel are opposedly mounted and sealably attached to the side panels, the front panel and the rear panel. Openings may be placed in one or more of the panels to accommodate input air volume 12, output air volume 26, an access door, a control panel and so forth.

Input air volume 12 contacts the flow controller 16, here a diffuser plate, upon entering enclosure 14. The diffuser plate 16 includes a plurality of openings of various sizes, shown in FIG. 3A, which are designed to take an air volume having a first velocity on an input face 78 of the diffuser plate 16 and produce a diffused input air volume 13 that is substantially uniform in both air pressure and velocity across the surface area of the output face 80 of diffuser plate 16. The openings, or holes 82, in diffuser plate 16 are varied such that a desired diffused input air volume 13 is produced. System 5 is typically designed to accommodate input air volumes from approximately 75 to 100 cu. ft. per minute and, in a preferred embodiment, the input air volume is 85 cu. ft. per minute.

The use of diffuser plate 16 ensures that each bank, also referred to as a stage or stack, of filters receives an equal portion of diffused air volume 13. An upper bank consisting of filter modules 18A-C and 20A, collectively upper bank 15, and lower bank consisting of filter modules 18D-F and 20B, collectively lower bank 17. A seal(s), such as, for example, 19A or 19B, may be employed between upper bank 15 and lower bank 17 to prevent air passage around the filters. Seals 19A and 19B may also form seals between filter modules 18 and enclosure 14.

As the diffused input air volume 13 passes through filter banks 15, 17, contaminants are removed by the plurality of filters. Typically, filter types are paired so that air passing through the upper bank receives the same type and level of filtering as the air passing through lower filter bank. In particular, filter 18A is the same type of filter as 18D, 18B is the same as 18E and so forth. The filters used within a given bank may be of the same or of varying types depending on the desired end result of the filtering operation. Filters 18 are typically designed to weigh less than 35 pounds (lbs.) apiece and, in a preferred embodiment, weigh approximately 27 lbs. apiece. HEPA filters 20A and 20B may be employed at the end of respective filter banks to remove airborne contaminants not trapped by the upstream filters. A diffused output air volume 24 exits HEPA filter 20A and 20B and moves in the direction of output end 7. As the air volume approaches output end 7, the volume may become somewhat compressed as it forms output air volume 26. An exhaust fan 22 may be employed to facilitate a higher air velocity as air moves through enclosure 14. An exhaust fan 22 may be used in conjunction with blower/fan 10 or in lieu thereof. Air volume 28 may be directed into duct work for distribution throughout a clean room or for directed flow to equipment located therein. Alternatively air volume 28 may flow directly into the ambient air volume within a clean room.

Filter systems, such as that shown in FIG. 1, may significantly reduce the concentration of airborne contaminants as long as the filters are operating at their specified efficiencies. As contaminants become trapped in filters, the filters efficiencies decrease. Maintaining desired contaminant levels within clean rooms necessitates replacing filters before efficiencies become unsatisfactory. Embodiments of the invention facilitate replacement of filters at proper intervals by monitoring the performance of each filter within enclosure 14. For example, sensors 30A-H monitor filters 18A-F and 20A, 20B as they operate within enclosure 14. Sensors 30A-H are in turn monitored by controller 32. Sensors 30A-H and controller 32 are shown and described in detail in conjunction with FIGS. 6A and 6B.

Figure 2A:
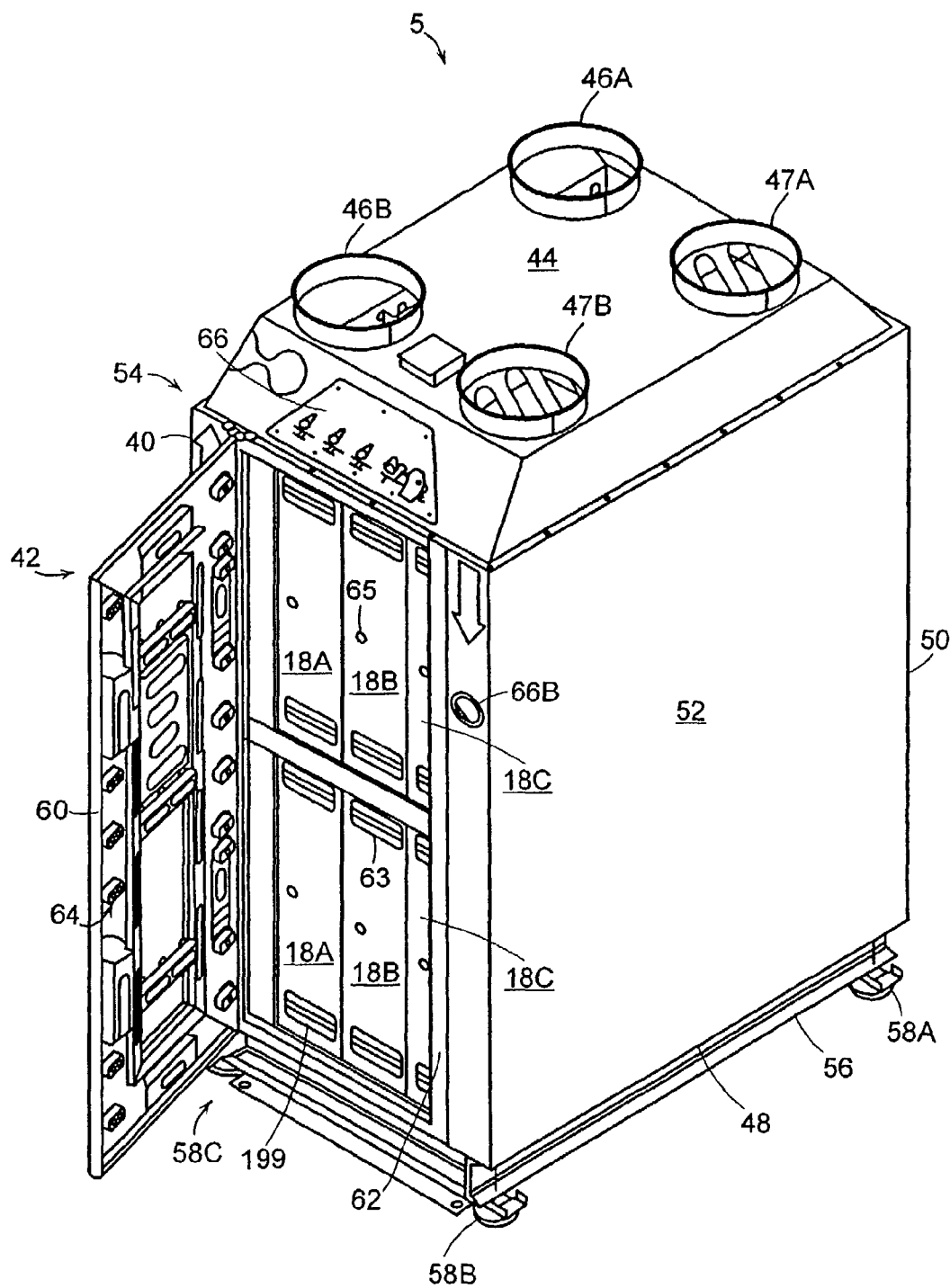
FIG. 2A is a perspective view of an exemplary embodiment of a filter system showing filter modules, an access door, air inlets and air outlets.

FIG. 2A illustrates an exemplary embodiment of filter system 5. As shown in FIG. 2A, filter system 5 is comprised of a front panel 40 having a hingedly attached access door 42, a top panel 44 having a plurality of inlets 46A, 46B at the input end 6 and a plurality of outlets 47A, 47B, a bottom panel 48, a rear panel 50, a first side panel 52 and a second side panel 54. Bottom panel 48 is fitted with a frame 56 comprising four levelers 58A, 58B, 58C and 58D threadedly attached thereto. Levelers 58 are used to adjust filter system 50 so that the sides are essentially plumb and top is level. Access door 42 may include a gasket 60 for sealing the door/front panel interface. Front panel 40 may also be fitted with a gasket 62 that is mateably adapted to form an essentially airtight seal when in contact with gasket 60.

Gaskets 60, 62 may be made of compliant materials that are essentially impenetrable by room air or gases used in the clean room. Examples of gasket materials that can be used with the invention are, but are not limited to, rubber, silicon, neoprene, latex, flexible conductive shielding, high density felt, compliant polymer and the like.

Access door 42 may employ a plurality of mechanical, electromechanical and/or electromagnetic catches 64 for holding access door 42 in a closed position with sufficient pressure on gaskets 60, 62 to prevent air passage through the interface region. The filter system of FIG. 2A can be equipped with a status and/or control panel 66.

Filters 18A-C are also shown in FIG. 2A. As further shown and described in conjunction with FIG. 4, the filters 18 are arranged in a matrix. Access door 42 facilitates installation and removal of filters 18A-C. The filters 18 may be equipped with grab straps 199, retractable handles or knobs to facilitate transport and removal. Filters 18A-C may also be equipped with retaining means 63 for holding filters 18A-C firmly in place. Retaining means 63 may be spring-loaded clasps, quarter-turn fasteners, screws, plastic/nylon friction fit retainers and the like. Filters 18A-C may also include a sampling port 65 into which, for example, a sampling device may be inserted for monitoring respective ones of filters 18. System 5 may further be equipped with a control panel 66 for use in setting operating parameters and for facilitating operator interaction with system 5. Control panel 66 may also report system status and errors to an operator. Control panel 66 may also include alternative display devices such as gauge 66B.

Sampling ports such as those describe herein and, for example, those used in a clean room or a semiconductor processing device can also comprise or have disposed therein a sampling tube orifice for monitoring gas flow quality and yield-reducing contaminants and contaminant levels. One example of such sampling ports are shown in FIG. 2A. In one embodiment, the tube orifice comprises a body portion having an aperture longitudinally disposed through the portion. The aperture features substantially frustoconical and cylindrical portions that define at least a first and second diameter of the aperture. The aperture can communicate with a gas flow in, for example, a clean room or an apparatus of the invention such that the gas then flows through the aperture until it exits the sampling tube orifice. The tube orifice permits a quality of gas flow to be conveniently monitored without changing the pressure during, for example, wafer fabrication. The orifice is fabricated so as to allow a continuous and uniform gas flow therethrough that can reduce sample variation and prevent aperture plugging. A tube orifice of the invention may also be used with existing sampling ports in, for example, a system or apparatus of the invention.

For example, a sampling tube orifice of the invention can communicate with an apparatus of the invention for removing contaminants for a gas in a semiconductor processing device. The apparatus can comprise a filter unit having a plurality of parallel filter stages located within the filter unit for removing at least a portion of the contaminants from the gas flowing therethrough. Optionally, the apparatus can include a flow controller for distributing the gas flow through the parallel filter stages. In another embodiment, a sampling tube orifice can communicate with an apparatus that, for example, comprises a filter unit having a plurality of parallel filter stages located therein for removing at least a portion of the contaminants from a gas passing therethrough. Preferably, the apparatus comprises a diffuser plate having an input face for receiving the gas and an output face for delivering the gas to the plurality of filter stages. Moreover, the diffuser plate can be mounted within the filter unit and configured to deliver substantially equal volumes of the gas to each member of the plurality of filter stages.

Figure 2B:
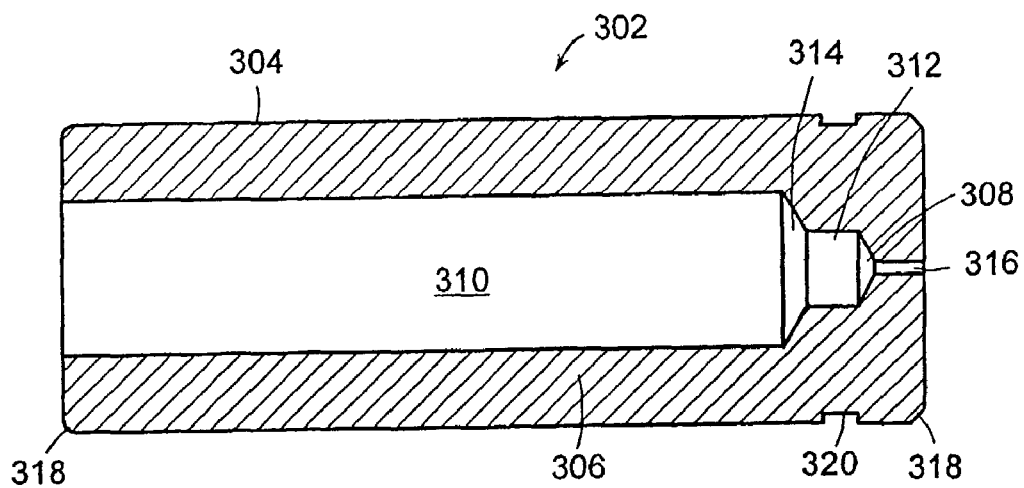
FIG. 2B is a cross-section of a sampling tube orifice of the invention.

FIG. 2B is a cross-section of a sampling tube orifice of the invention. The tube orifice 302 comprises a body portion 304 through which an aperture 306 is longitudinally disposed. In one embodiment, the aperture comprises a substantially frustoconical portion 308 and a cylindrical portion 310. The portions define at least a first and second diameter of the aperture. An exemplary first and second diameter for the aperture may be in a range from about 0.1 to 0.5 inches (2.54 to 12.7 mm). The first diameter is defined by the frustoconical portion of the aperture. The first diameter is generally smaller than a second aperture diameter defined by the cylindrical portion. These differences in aperture diameter allow a continuous low gas flow volume through the tube orifice at a uniformly high velocity.

The frustoconical 308 and cylindrical 310 portion diameters may vary in size depending on a particular application. These aperture portions can also be fabricated so that their diameter or shape changes. For instance, the frustoconical portion of the aperture 306 is shown featuring a cylindrical segment 312 having a uniform diameter. The diameter and shape of the various aperture portions and segments are guided by a need to have a continuous low volume gas flow through tube orifice that does not cause detrimental pressure changes during, for example, wafer processing or fabrication. The low volume gas flow can permit gas quality to be monitored for, for example, yield-reducing contaminants without ever interfering with the underlying process such as wafer fabrication. Moreover, the continuous low volume gas flow allows sampling to occur without the need for time consuming purging. A continuous gas flow also prevents the aperture from becoming plugged.

The diameter and shape of the various aperture portions and segments are also guided by the desire to have a uniform gas throughput. Such uniform gas throughput can reduce the extent of variability among different samples. A uniform or consistent gas throughput also prevents the gas from being retained or held within the orifice during use. Sampling ports can yield inconsistent results when monitoring gas flow quality for, for example, yield-reducing contaminants as uneven or obstructed flow in the port can affect sample uniformity. A sampling tube orifice of the invention avoids such uneven or obstructed gas flow by employing a finely machined aperture that comprises portions or segments having gradually transitioning diameters and shapes.

FIG. 2B shows such gradual changes in diameters and shapes with the tube orifice aperture 306 comprising a transition portion 314. The transition portion communicates with the cylindrical segment 312 of frustoconical portion 308 and the cylindrical portion 310. The portion 314 defines at least a third aperture diameter. As shown, the portion has a diameter that gradually decreases in size between the cylindrical portion 310 and segment 312. The diameter of the transition portion 314 ranges from about 0.1 to 0.3 inches. The aperture 306 may also comprise a sampling portion 316 that defines at least a fourth aperture diameter in a range from about 0.005 to 0.1 inches. The sampling portion 316 can be used to withdraw gas samples from the tube orifice aperture 306.

The sampling portion 316 of the tube orifice aperture 306 can communicate with the frustoconical portion 308. Gas flows may be withdrawn from the sampling portion 316 by using a conventional sample collection device. In one embodiment, the portion 316 can be configured so that gas flow therefrom is delivered directly to analysis equipment for monitoring gas quality such as a gas chromatograph. The low volume of gas flow exiting the aperture 306 through its sample portion 316 makes the sampling tube orifice 302 convenient for coupling directly to such analysis equipment via, for example, pneumatic tubing.

The tube orifice 302 can be composed of any material that is suitable to be finely machined and provide for a consistent gas flow therethrough. The composition of the tube orifice can also vary depending on a given application or conditions under which the orifice may be used. An exemplary material for monitoring gas flow quality from, for example, an apparatus of the invention is sapphire. In one embodiment, the sampling tube orifice may include a composite structure including several materials in various amounts. The composition of the tube orifice can also vary depending on the abrasiveness or potential etchants within the gas flowing through its aperture. A sampling tube orifice of the invention is also substantially heat resistant as gas flowing through the aperture generate a significant amount of heat or excessive heat can also be brought about by processing conditions.

The body portion 304 of the sampling tube orifice 302 features an exterior surface. In one embodiment, the exterior surface of the body portion 304 can be substantially cylindrical. Although the dimensions of a tube orifice may vary for specific uses, an exemplary orifice has a length from about 0.5 to 2.5 inches. For a tube orifice having a substantially cylindrical exterior, the diameter can be from about 0.1 to 1.5 inches. The diameter of a sampling tube orifice may also be standardized to the size of commercially available pneumatic tubing. This standardization of the tube orifice diameter is convenient for directly coupling the orifice to typical gas analysis equipment such as, for example, a gas chromatograph.

Figure 2C:
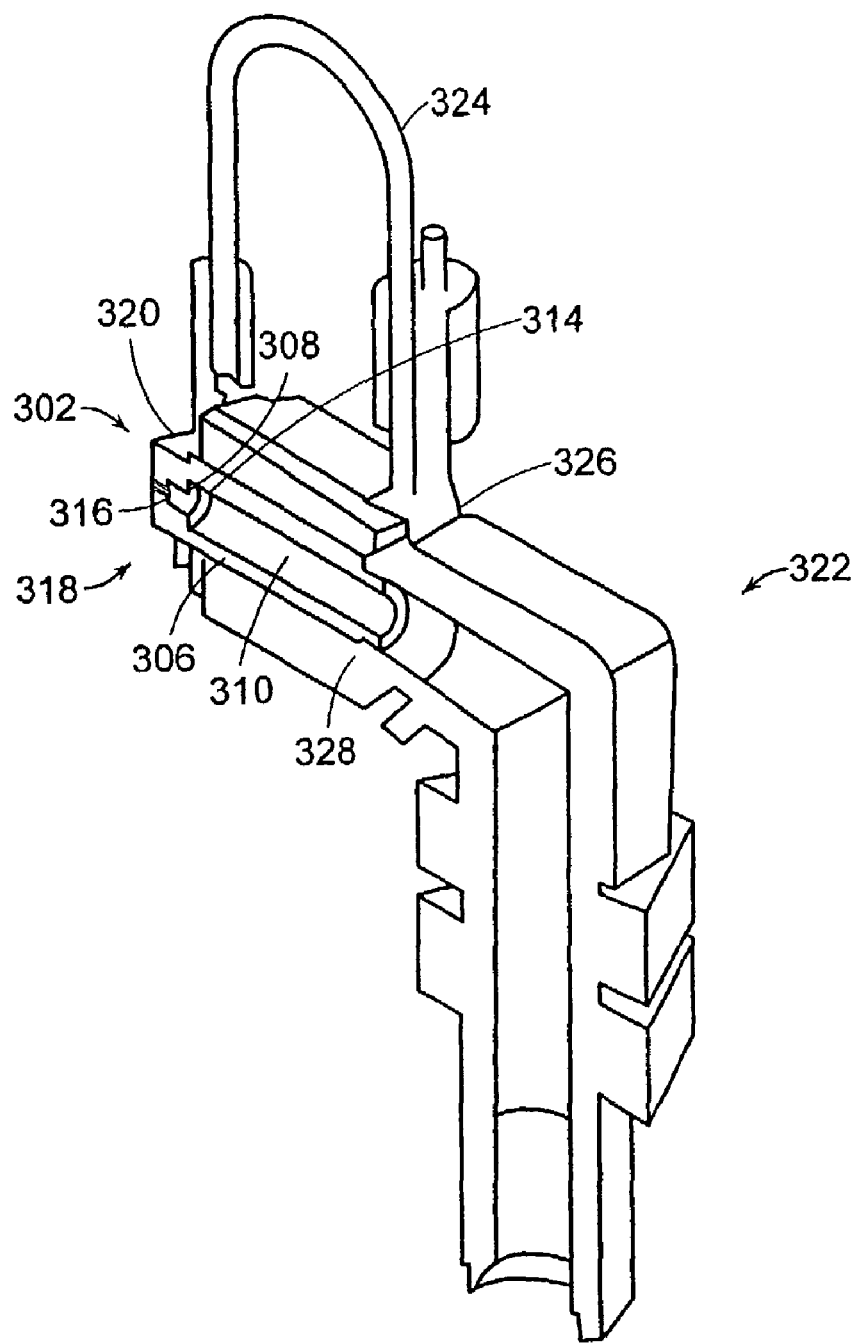
FIG. 2C is a partial representation of a sampling tube orifice of the invention disposed within a sampling port.

FIG. 2B shows the exterior surface of the body portion 304 having angled portions 318. These angled portions are optionally disposed about the orifice exterior. The exterior tube orifice surface can also have at least one channel 320 disposed about the body portion 304. In one embodiment, the angled portions 318 and channel 320 are configured such that the tube orifice can be readily disposed in and removed from a sampling port such as those described herein. FIG. 2C shows a partial representation of a sampling tube orifice according to the invention disposed in a sampling port such as for an apparatus of the invention. As shown, the orifice 302 can be held in place within a sampling port 322 by a retaining member 324 cooperating with a channel 320, which is disposed about the tube orifice.

The sampling port 322 may be associated with or coupled to any type of process in which it may be necessary to monitor gas flow quality. An exemplary gas sampling port can be used with any of the embodiments described herein or, for example, those used in or with a clean room or a semiconductor processing device. The sampling tube orifice in FIG. 2C is shown having an exterior surface with a notch 326 configured to rest against an interior sampling port flange 328. The notch and flange prevent the tube orifice from being forced into the sampling port. The retaining member 324 is shown as cooperating with the channel 320 to hold the tube orifice in place such that it does not slide out from the sampling port. The member 324 is coupled to an exterior of the sampling port 322. The retaining member 324 can also be liftably moved from its cooperation with the channel 320 in order to remove the orifice 302 for the port. The sampling tube orifice can be removed from the port 322 for cleaning or replacement with another orifice.

FIG. 2C also shows an angled portion 318 disposed about the exterior of the sampling tube orifice 302. The portion 318 may be configured so as to receive, for example, pneumatic tubing. In addition, FIG. 2C shows the aperture 306 of the tube orifice comprising a substantially frustoconical 308 and cylindrical 310 portion. The aperture 306 also has a transition 314 and sampling 316 portion. As described above, the aperture 306 can have portions or segments of any dimension or shape that would be suitable for a continuous low gas flow volume through the orifice at a uniformly high velocity. The dimensions and shape of the aperture portions or segments also reduces the extent of variability of gas flow by avoiding any uneven or substantially obstructed areas.

In one embodiment, the cylindrical portion 310 of the tube orifice 302 receives the gas sample. The sample then passes through the aperture portions or segments at a gas flow velocity that is substantially constant. The sample eventually exits the aperture 306 through the sampling portion 316 shown within FIG. 2C. The cylindrical portion can communicate directly with the gas flow from, for example, an apparatus of the invention. For example, the cylindrical portion 310 can communicate with an apparatus comprising a filter unit having a plurality of parallel filter stages located within the filter unit such that the quality of gas flow in the apparatus can be monitored via the sampling tube orifice for yield-reducing contaminants and contaminant levels.

Alternatively, a tube orifice according to the invention can be disposed in an existing sample port in a clean room or for a semiconductor tool. The continuous low volume gas flow through the orifice does not disrupt the pressure in such environments. The orifice 302 is also useful as it can continuously monitor gas flow quality in situ using conventional gas analysis equipment. Such gas analysis equipment can include, without limitation, a chromatograph, mass spectrometer or a combination thereof.

A tube orifice of the invention can also be fabricated so as to have precise tolerances. For instance, an orifice that is substantially composed of sapphire can have machined tolerances in a range of about 0.001 to 0.005 inches along the aperture. In addition, the body portion of the tube orifice can have machined tolerances in a range from about 0.001 to 0.05 inches. Such fine tolerances influence the uniformity of gas flow in the aperture as well as the consistency among different gas samples. The precise tolerances for a tube orifice of the invention also tend to provide consistency to the fabrication of multiple sampling tube orifices.

The present invention also provides a method for monitoring gas flow quality, such as, for example, for yield-reducing contaminants, using a sampling tube orifice. In general, the method involves providing a tube orifice of the invention for a given process environment such as, for example, an apparatus for removing contaminants for a gas in a semiconductor processing device. A continuous gas flow enters the aperture of the tube orifice and passes through the aperture. The gas flow is then withdrawn from the sampling tube orifice aperture. The gas flow can be sampled using a conventional collection device. The quality of the gas may then be analyzed by using standard equipment such as a chromatograph. The tube orifice can also be configured so that the gas flow is delivered directly to such analysis equipment. The method of the invention allows gas flow quality to be monitored at specific intervals or continuously without any disruption of, for example, the underlying process from which the gas sample was taken.

Figure 3C:
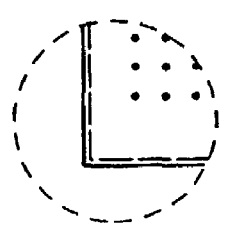
FIGS. 3A-3D illustrate a front view of a diffuser plate, a side view of a diffuser plate and an exploded view of an exemplary hole pattern; respectively.
Figure 3D:
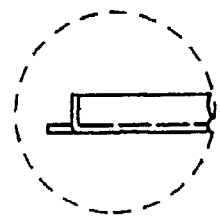
Figure 3B:
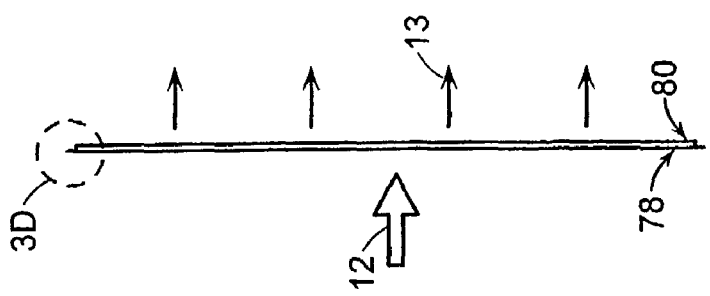
Figure 3A:
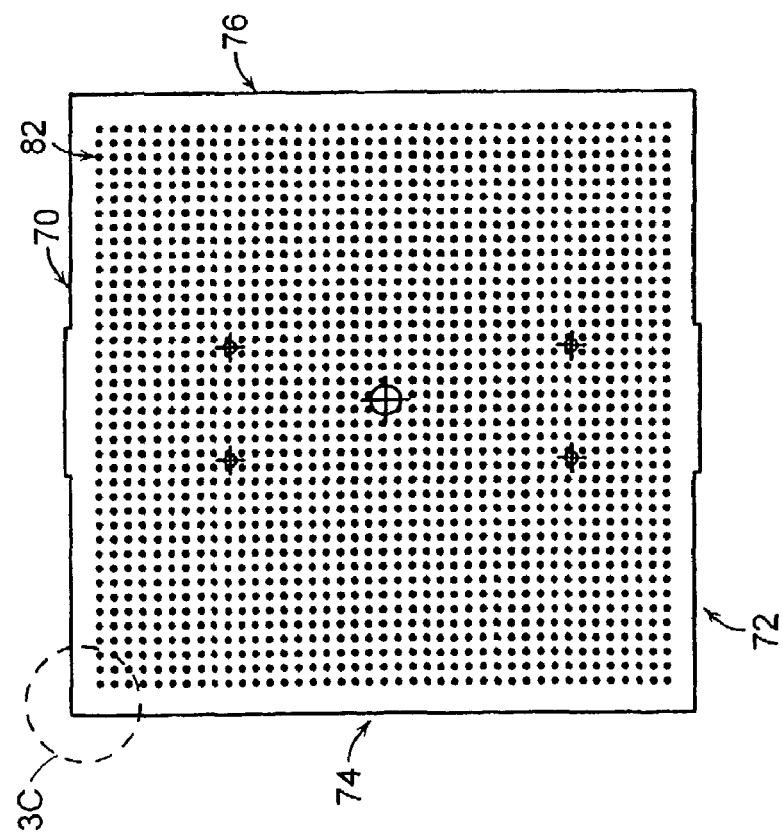

FIG. 3A illustrates an embodiment of flow controller 16 in the form of a diffuser plate having an essentially planar shape terminating at an upper edge 70, lower edge 72, a first side edge 74, a second side edge 76, and having an input face 78, and an output face 80 (FIG. 3B). Diffuser plate 16 is made of an essentially air-impermeable material such as aluminum, plastic, etc. having a plurality of holes 82, or voids, disposed thereon. Holes 82 may be arranged in a geometric pattern or may be randomly distributed across the surface of diffuser plate 16. In addition, holes 82 may be of the same size, or they may vary in size. In addition, the pitch, or density, of holes 82 may vary with their respective locations on diffuser plate 16. By way of example, the diffuser plate 16 of FIG. 3A may be installed within the enclosure 14 of FIG. 2 along the second side panel 54 and substantially parallel thereto. Diffuser panel 16 may further be mounted in a manner forcing an input air volume entering inlets 46A, 46B to be presented to the input face 78 of diffuser panel 16 such that it passes through holes 82 before contacting filters 18. The diffuser panel 16 of the example may employ a hole pattern that has smaller sized holes toward upper edge 70 and progressively larger sized holes as lower edge 72 is approached. Such a hole pattern may facilitate formation of a diffused air volume 13 having essentially the same flow velocity and/or pressure across output face 80.

Diffuser plate 16 may be designed and simulated using computer aided drafting and analysis software to reduce testing and fitting iterations in actual systems. The diffuser plate 16 can be designed such that diffused air volume 13 is substantially uniform across output face 80. Holes 82 will typically be circular in shape, perpendicular to, and flush with the input and output faces of diffuser plate 16; however, holes 82 can take other forms. For example, holes 82 may penetrate diffuser plate 16 at an angle, may have contoured or beveled edges at input face 78 and/or output face 80, may extend beyond input face 78 and/or output face 80, etc. In addition, holes 82 may have any shape such as, for example, elliptical, square, triangular, etc.

Diffuser plate 16 is normally mounted in enclosure 14 in a manner that prevents input air volume 12 from passing around diffuser plate 16. For example, a seal, or gasket, contacting upper edge 70, lower edge 72, first side edge 74 and second side edge 76 may serve as an essentially air-impermeable interface between diffuser plate 16 and the inner surface of enclosure 14. In addition, seals made of compliant materials can act as a damping means for reducing unwanted vibration and noise. If desired, diffuser plate 16 can be outfitted with sensors for monitoring the velocity and pressure of input air volume 12 and/or diffused input air volume 13.

Flow controller 16 has been shown and described thus far as a diffuser plate; however, the flow controller 16 is not limited to this form factor. For example, flow controller 16 may comprise one or more actuated valves disposed proximate to input end 6 in a manner causing them to block gas passage unless actuated to open by a variable amount. Such a plurality of valves may be operated in conjunction with tubing and/or ductwork to produce uniform air volumes entering upper stack, or stage, 15 and lower stack, or stage, 17. Active flow control may also be employed in conjunction with a diffuser plate 16 by utilizing an electromechanical, mechanical, pneumatic, or hydraulic means for adapting the size of holes 82 according to definable criteria such as air flow or operational integrity of a filter stack 15, 17. By way of example, a diffuser plate 16 may be equipped with variable apertures at some or all of the hole locations. The apertures are capable of being opened to allow more gas passage or constructed to reduce or eliminate passage of input air volume 12 therethrough.

Diffuser plate 16 may also operate in conjunction with a baffle extending from input seal 19A and contacting diffuser plate 16 at a substantially ninety-degree angle. The baffle can also span the front to back depth of enclosure 14 so as to prevent air on one side of the baffle from moving to the other side of the baffle. A baffle, if employed, provides a physical barrier between the portion of diffused input air volume 13 directed to lower stack 17 and the portion directed to upper stack 15. Diffuser plate 16 is designed to provide uniform air volumes to upper stack 15 and lower stack 17 when operating in conjunction with a baffle.

Figure 4A:
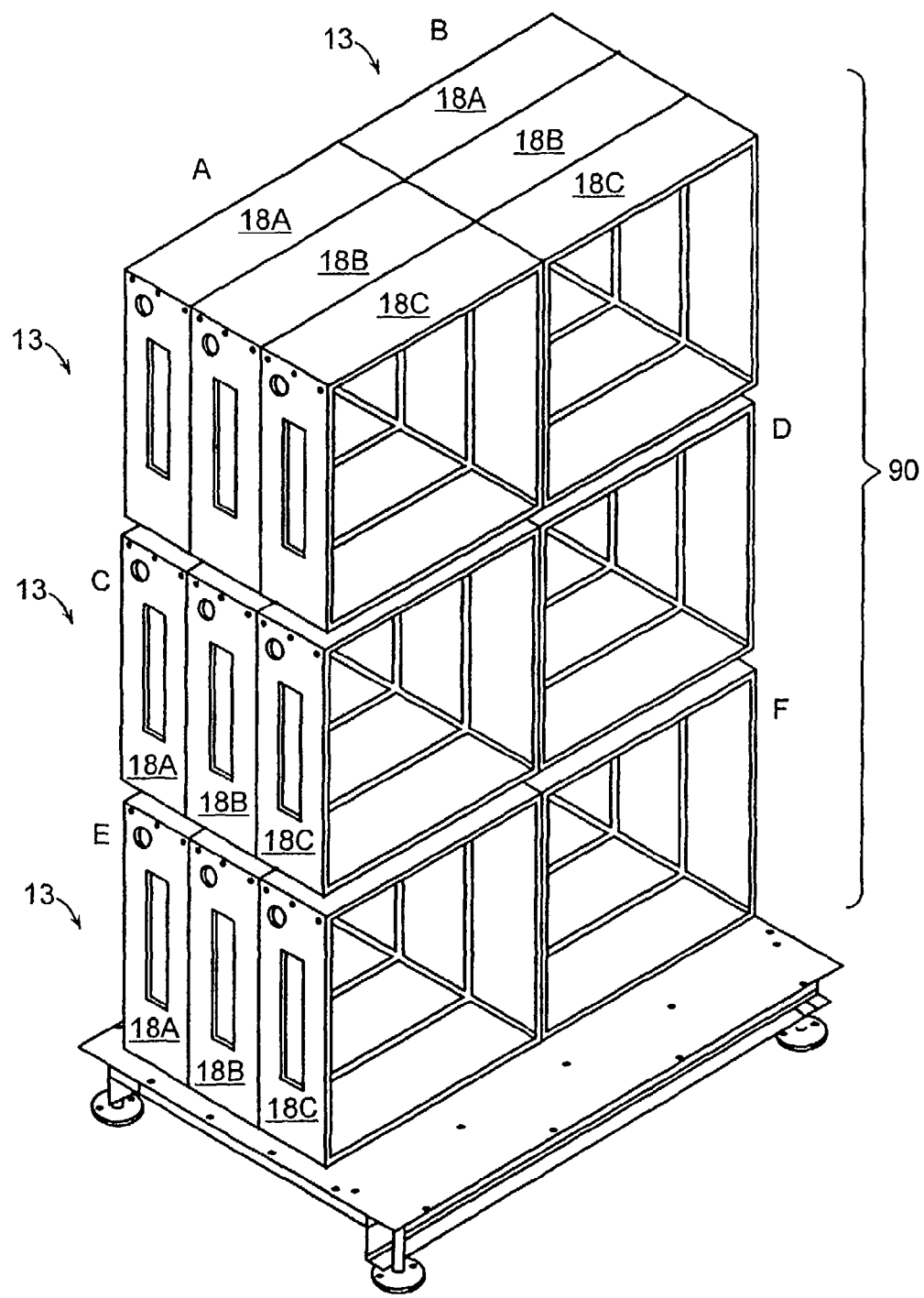
FIG. 4A is a perspective view of an exemplary 3×2 matrix of filter modules in accordance with the exemplary embodiment of FIG. 2.
Figure 4B:
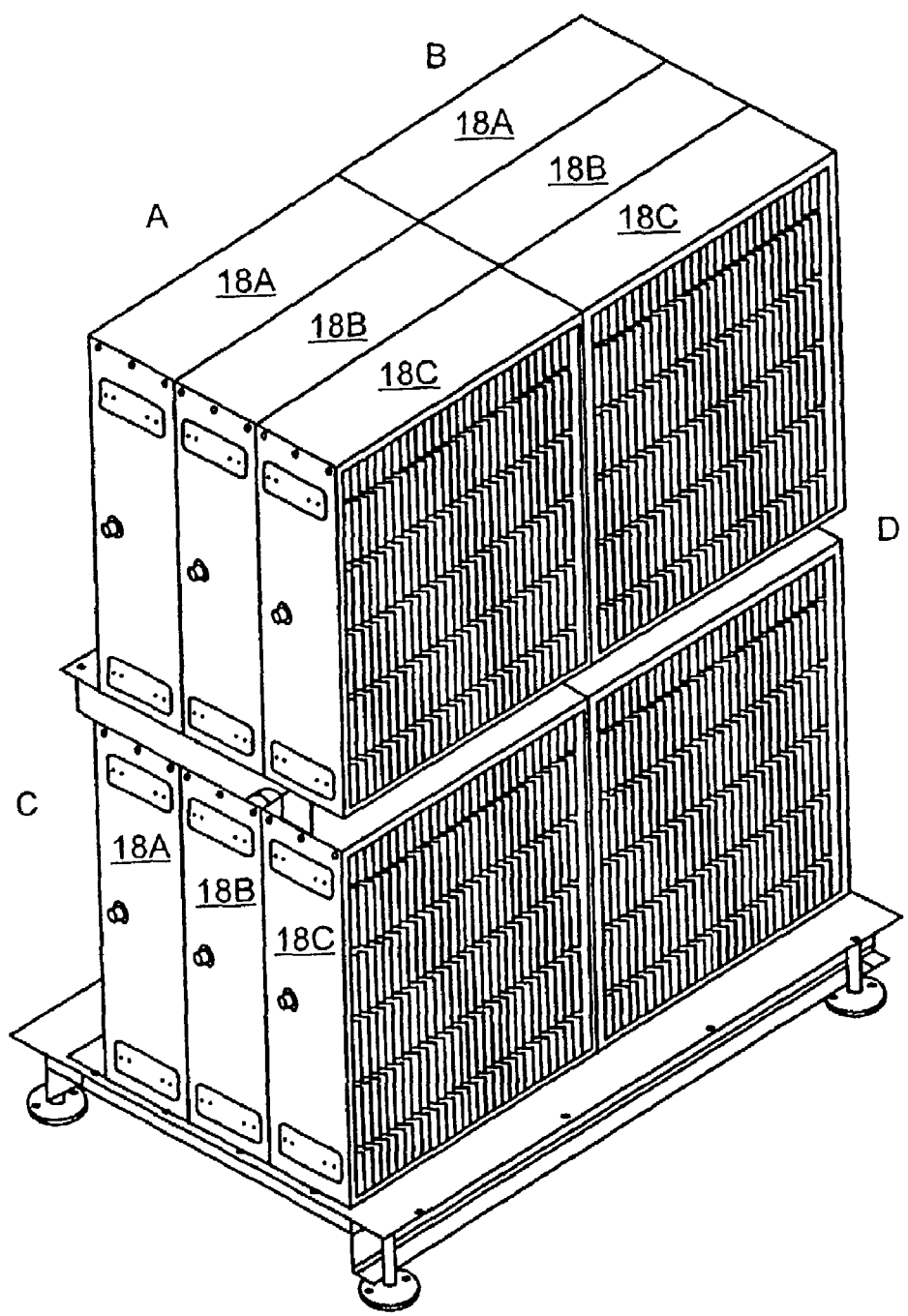
FIG. 4B is a perspective view of an exemplary 2×2 matrix of filter modules in accordance with an exemplary embodiment of the invention.

FIG. 4A illustrates an exemplary filter layout that can be employed with embodiments of the invention such as was shown in FIG. 2. FIG. 4A contains six filter banks shown as A-F, respectively with each having a separate diffuser plate. Each bank contains three filters 18A-C. In FIG. 4, each bank contains identical filters; however, the respective banks A-F can employ different filters or can utilize the same filters but in different orderings with respect to the distributed input air volume 13. The filter banks A-F form a filter matrix 90, here a 3×2 matrix. Filter matrices of any size and number of filters 18, 20 may be employed depending on the volume of air to be filtered, the desired level of contaminant removal and a defined, or desired, time-between changes for filter elements. For example, a 2×2 matrix such as that shown in FIG. 4B may be used in applications requiring a smaller operating volume, less contaminated incoming air, and/or shorter operating intervals between filter changes. Returning to FIG. 4A, filters 18A-C may be chemical filters designed to remove specific types of airborne chemicals. If desired, a HEPA filter 20 may be used in conjunction with filters 18A-C to reduce the overall level of nonchemical particulate matter such as dust or pollen.

Figure 5A:
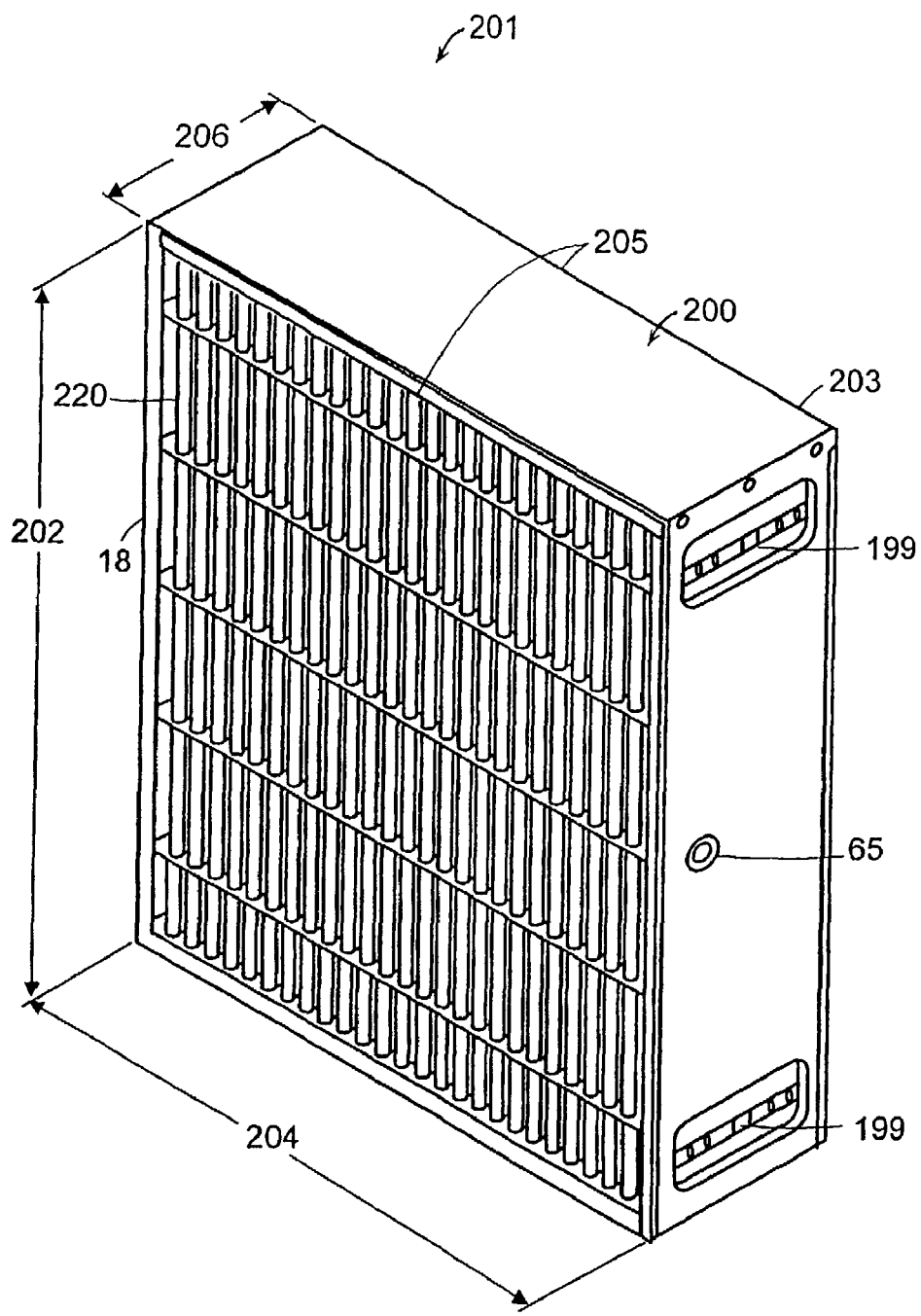

FIG. 5A illustrates an exemplary filter module 18 mounted within a frame 200 having a height 202, length 204 and depth 206. Frame 200 may be comprised of a single piece into which filter module 18 is installed, or it may be comprised of two or more pieces that can be disassembled and then reassembled around filter module 18. Employing a removable frame 200 as part of filter assembly 201 facilitates manufacture of less costly filter modules 18 since they can be manufactured with less structural support and without sealing/mounting means for attachment to the interior of enclosure 14. Filter modules 18 are designed to be replaced when their ability to remove airborne contaminants has been diminished below a defined performance threshold. In addition to providing structural support, frame 200 sealably mounts to the interior of enclosure 14 directly or indirectly by way of a framework or other intermediary mounting means, to form a conduit for encouraging diffused input air volume 13 to flow through filtering media 220.

Figure 5B:
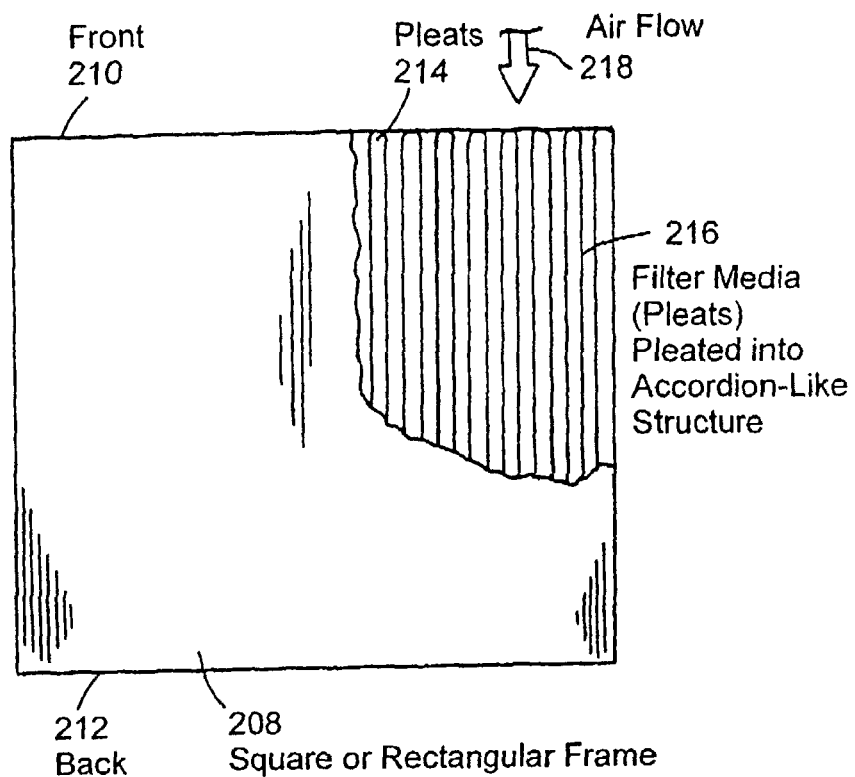
Figure 5C:
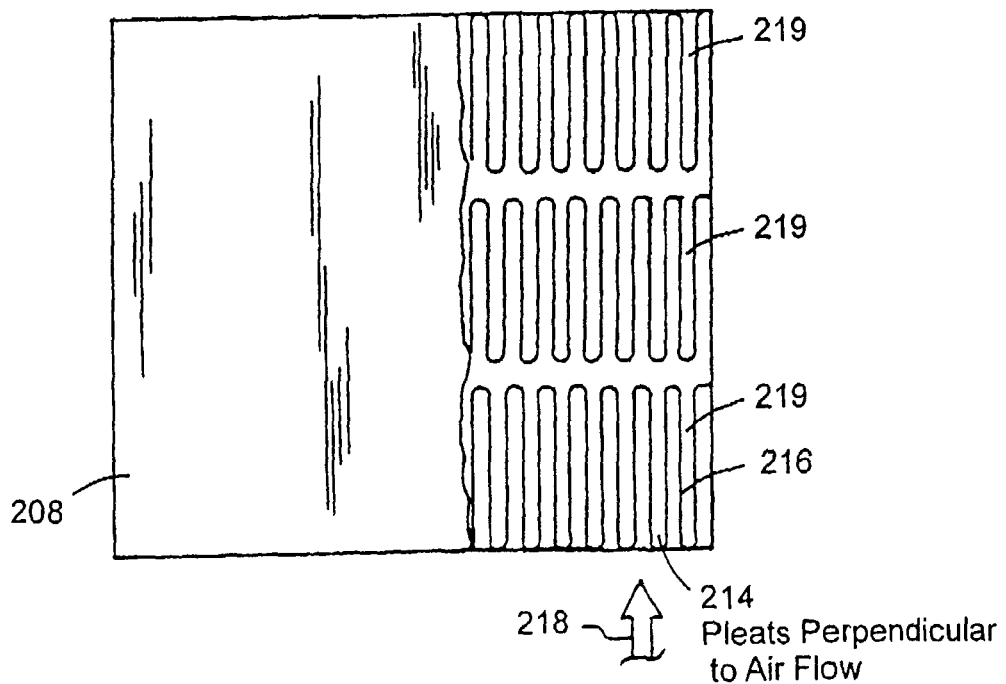

FIG. 5B illustrates an embodiment of a filter module 18 containing pleated filtering media 216 arranged in an accordion-like structure. The filter module 18 has a square or rectangular container, or shape, 208 and further has a front end 210 perpendicularly facing air flow 218 and further has a back end 212. FIG. 5C illustrates another embodiment of filter module 18 also employing a square container 208 and utilizing pleated composite filter elements 219 sequentially disposed within container 208. The pleats 219 are preferably oriented perpendicular to air flow 218.

Figure 5D:
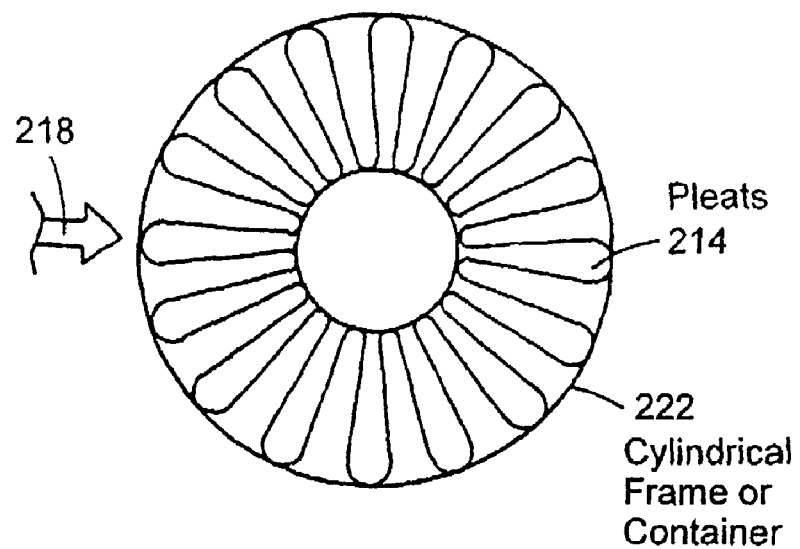
Figure 5E:
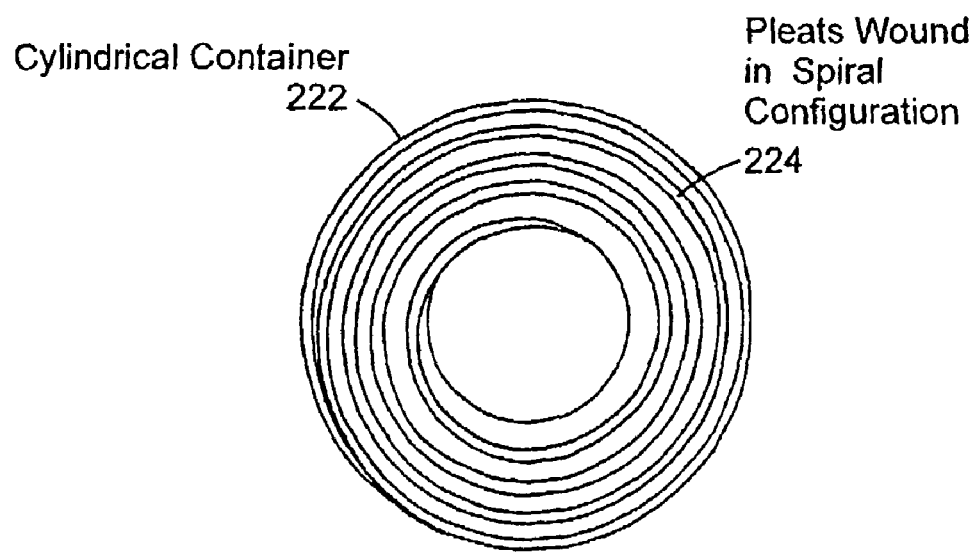

FIG. 5D illustrates still another embodiment of filter module 18 employing a cylindrical container, or frame 222. The filter module 18 of FIG. 5D employs pleats 214 radially disposed throughout the cylindrical container 222. Air flow 218 impinges on filter module 18 perpendicular to the main axis of the cylinder which is into the page of FIG. 5D. FIG. 5E illustrates yet another embodiment of filter module 18 disposed in a cylindrical container 222 and employing filtering media arranged in a spiral configuration 224.

Figure 5F:
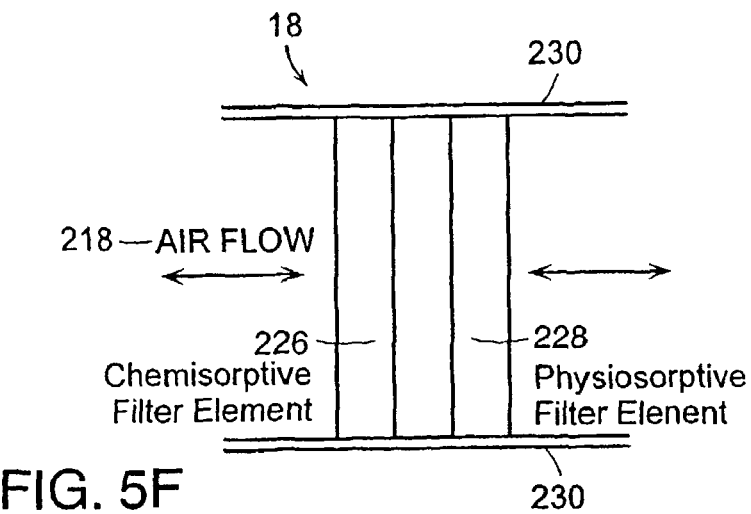

FIG. 5F illustrates a schematic representation of a filter module 18 comprising two types of filtering elements, chemisorptive filter element 226 and physisorptive filter element 228, respectively. Conduit 230 is formed by frame 200 or other means and serves to channel air through the filter elements 226 and 228 to remove contaminants therefrom. Chemisorptive filter element 226 and physisorptive filter element 228 are arranged in series with chemisorptive filter element 226 filtering air flow 218 prior to physisorptive filter element 228.

The chemisorptive filter element 226 may include porous, chemisorptive media formed with a copolymer having an acidic functional group that enables the group to react with a reagent. The physisorptive filter element 228 includes physisorptive media, such as untreated, activated carbon. The term "untreated" as used herein means an activated carbon that has not been modified by chemical treatment to perform chemisorption; rather, untreated, active carbon remains as a physical, or nonpolar, adsorbent. The physisorptive media remove organic and inorganic condensable contaminants, typically those having a boiling point greater than 150° C. via physisorption, while the chemisorptive media remove basic vapors via chemisorption.

The term "physisorption" refers to a reversible adsorption process in which the adsorbate is held by weak physical forces. In contrast, the term, "chemisorption" refers to an irreversible chemical reaction process in which chemical bonds are formed between gas or liquid molecules and a solid surface. The relative thicknesses of the chemisorptive filter element 226 and the physisorptive filter element 228 can be engineered so that the useful life of the two filter elements will be exhausted at approximately the same time in a given environment.

Accordingly, a chemisorptive filter element formed of sulfonated polymer can be made thinner than a physisorptive filter element formed of untreated carbon, since the physisorptive properties of the carbon will typically be exhausted more quickly than the chemisorptive properties of the acidic, sulfonated polymer. The two composite filter components 226 and 228 can be contained within any suitable container(s) or framework(s) for installation in an airflow path of a filtering apparatus coupled with a photolithography tool, the filter components 226 and 228 typically being in the form of removable or replaceable filter elements. For many purposes, it is preferable to increase the surface area of the filter material exposed to an incident air flow; and, for this purpose, the composite filter elements can be pleated to provide the increased surface area.

Figure 5G:
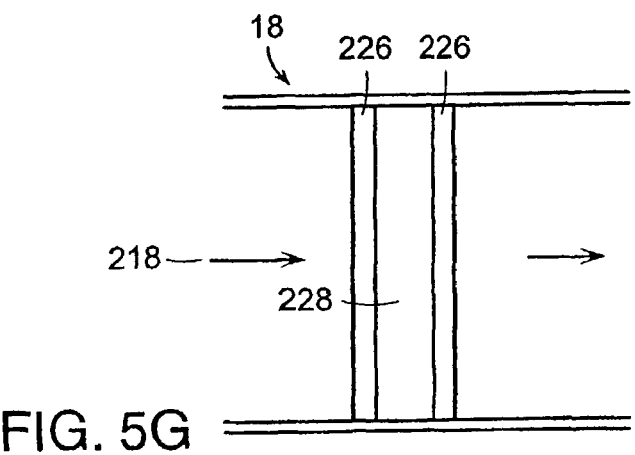
Figure 5H:
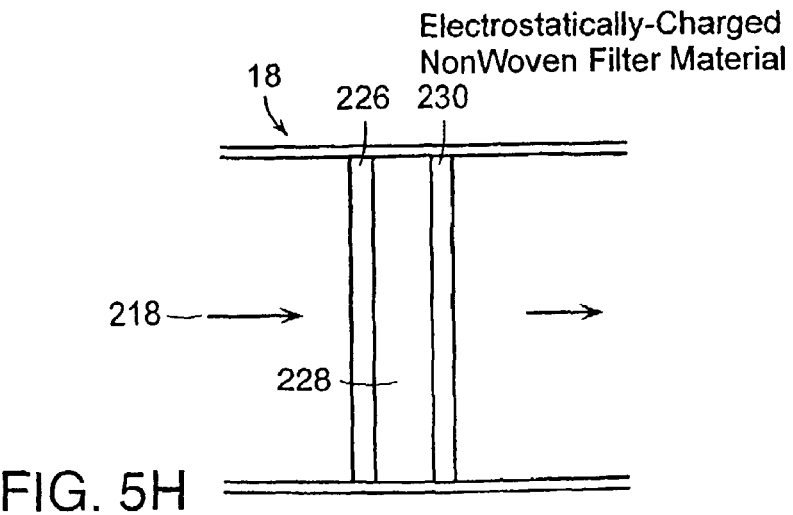
Figure 51:
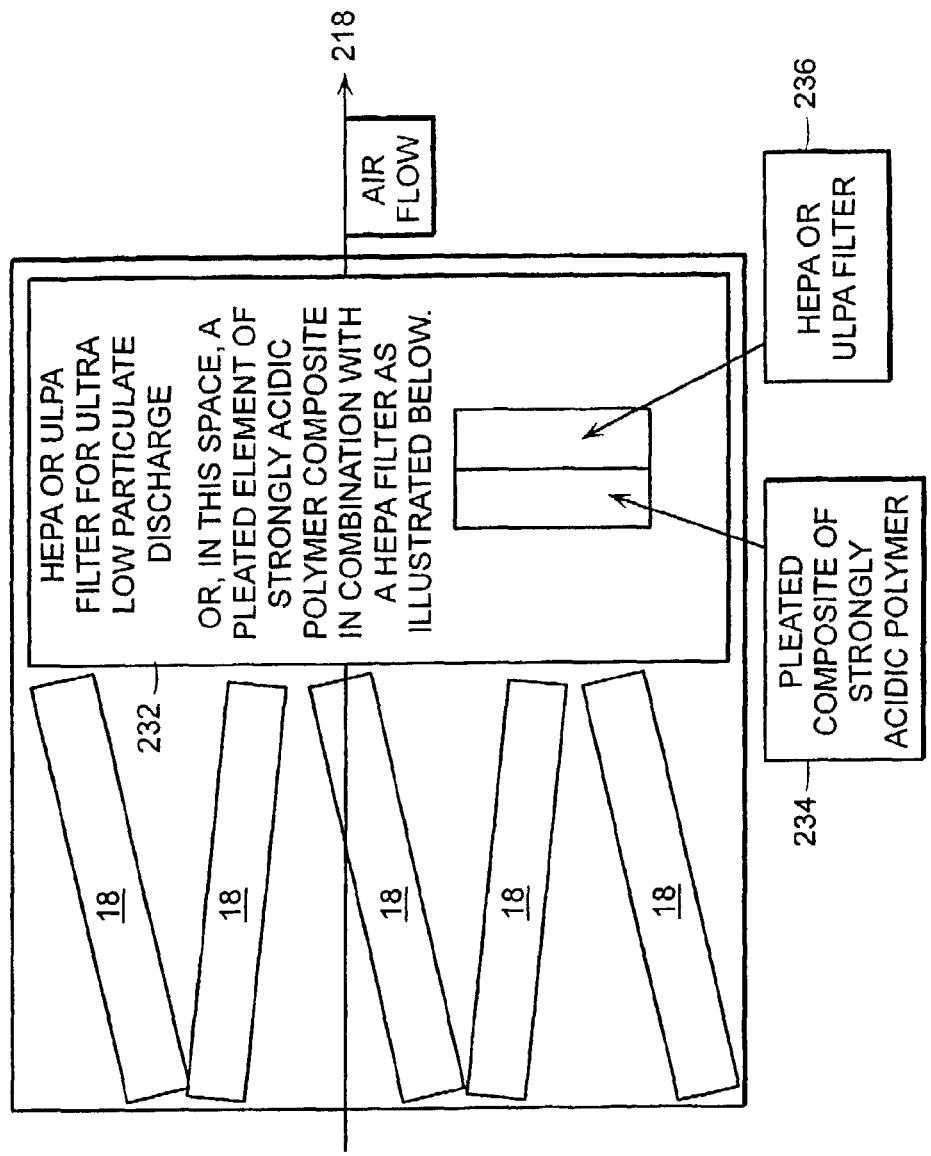

FIG. 5G illustrates a schematic representation of an alternative embodiment of filter module 18 comprising a physisorptive filter element 228 mounted between two chemisorptive filter elements 226. FIG. 5H illustrates a schematic representation of a further alternative embodiment of filter module 18 comprising physisorptive filter element 288 mounted between a chemisorptive filter element 226 and an electrostatically-charged, non-woven filter element 230.

The apparatus illustrated in FIGS. 5F-H are designed to remove lower-boiling point contaminants with greater effectiveness and to better optimize the separate conditions under which the chemisorptive media and physisorptive media operate. By providing better purification of the air stream entering a photolithography tool, better protection is provided against photoresist contamination from airborne molecular bases and photo-induced organic contamination of optics surfaces.

FIG. 5I illustrates an embodiment of a high surface area filter assembly consisting of a plurality of filter modules 18 oriented in an angular relationship with respect to air flow 218 and in line with a HEPA or ultra low particulate air (ULPA) discharge filter element 232. The embodiment a pleated composite of strongly acidic polymer filter element 231 operating in conjunction with a HEPA or ULPA filter 236. High surface area filter elements such as those described herein can be fabricated using three dimensional printing techniques such as described in U.S. Pat. Nos. 5,204,055, 5,340,656, and 5,387,380, the entire contents of these patents being incorporated herein by reference in their respective entireties.

Filter modules 18 described hereinabove can have a variety of constructions. In a first example, a bed of polymer pellets and untreated, activated carbon may be exposed to an airstream using a traditional media tray and rack system (e.g., a metal enclosure that uses perforated material or screens both to hold in the adsorbent while allowing air to flow through the structure). In a second example, the filter may be in the form of a honeycomb configuration where polymer pellets and untreated, activated carbon are held in a partially-filled or completely-filled honeycomb structure. In a third example, a polymer and untreated, activated carbon may form a monolithic porous or honeycomb structure. In a fourth example, a mat of polymer fibers, either woven or nonwoven, incorporating untreated, activated carbon, are pleated and arranged into a traditional pleated air filter such as those shown in FIGS. 5F-H. While in a fifth example, a bed of activated carbon pellets are exposed to the airstream using a traditional media tray and rack system with a layer of nonwoven composite material comprising acidic polymer, comprising a sulfonated copolymer-based composite material attached or incorporated into one side or both sides of the carbon tray.

In addition to having various constructions, embodiments of filter modules 18 consistent with the invention may further take many forms such as the activated carbon embodiment(s) discussed in U.S. Pat. No. 5,582,865, which is hereby incorporated by reference herein. This filter can have two (or more) layers, one of activated carbon and one of sulfonated divinyl benzene styrene copolymer beads. Additionally, two or more materials can be mixed to provide a composite filter consistent with this embodiment.

In still other embodiments, a synthetic carbon material, such as that described in U.S. Pat. No. 5,834,114, the contents of which are incorporated herein by reference in their entirety, can be coated with the acidic materials of the present invention to provide a porous acidic filter element in accordance with the invention. And, in yet another embodiment, the activated nutshell carbon media described in U.S. Pat. No. 6,033,573, the contents of which are incorporated by reference in their entirely, can be used alone or in combination with any of the chemisorptive or physisorptive media described herein to remove contaminants from the air flowing through the conduit in the same manner as is taught in this specification. Furthermore, controller 32 and sensors 30 may be used in conjunction with filter modules 18 for determining when the filter needs to be replaced by detecting base contaminants in air as described in U.S. patent application Ser. Nos. 09/232,199, 08/795,949 and 08/996,790 can also be used with the present invention. Each of these patent applications is incorporated in the present application in its respective entirety by reference.

FIG. 6A illustrates an exemplary embodiment of controller 32 which can be used in conjunction with sensors 30 for monitoring the performance of filters 18 and 20. Controller 32 may be comprised of a general purpose computer executing machine readable instructions, or function-executable code, for performing operations to monitor filter operation. Controller 32 may include a processor 102, main memory 104, read only memory (ROM) 106, storage device 108, bus 110, display 112, keyboard 114, cursor control 116 and communication interface 118.

The processor 102 may be any type of conventional processing device that interprets and executes instructions. Main memory 104 may be a random access memory (RAM) or a similar dynamic storage device. In addition, for storing information and instructions to be executed by processor 102, main memory 104 may also be used for storing temporary variables or other intermediate information during execution of instructions by processor 102. ROM 106 stores static information and instructions for processor 102. It will be appreciated that ROM 106 may be replaced with some other type of static storage device. The data storage device 108 may include any type of magnetic or optical media and its corresponding interfaces and operational hardware.

For example, data storage device 108 stores information and instructions for use by processor 102. Bus 110 includes a set of hardware lines (conductors, optical fibers, or the like) that allow for data transfer among the components of controller 32. Display device 112 may be an LCD, a cathode ray tube (CRT), or the like, for displaying information to a user. The keyboard 114 and cursor control 116 allow the user to interact with the controller 32. The cursor control 116 may be, for example, a mouse. In an alternative configuration, the keyboard 114 and cursor control 116 can be replaced with a microphone and voice recognition means to enable the user to interact with the controller 32 or may be replaced with a touch-sensitive display or a soft-panel function pad having particular buttons preprogrammed to execute specific functions.

Communication interface 118 enables the controller 32 to communicate with other devices/systems via any communications medium. For example, communication interface 118 may be a modem, an Ethernet interface to a LAN, or a printer interface. Alternatively, communication interface 118 can be any other interface that enables communication between the controller 32 and other devices or systems such as a wireless RF or free space optical networking interface.

In a preferred embodiment, communication interface 118 is coupled to, among other things, sensors 30A-30H. Coupling between communication interface 118 and sensors 30 may be comprised of wire, optical coupling media or wireless media. For example, sensors 30 may be comprised of gas sampling means known in the art or described hereinabove. Sensors 30 will have an inlet port for accepting a sample and an outlet port for making the collected sample available to an analysis component when sensor 30 does not contain its own analysis hardware and/or software or for providing processed analyzed output. Examples of sensors and/or sensor/analyzers that may be employed in embodiments of the invention are, but are not limited to, refractory traps, selectively permeable membrane traps, gas chromatograph/flame ionization detection, ion chromatography, mass spectrometry and hybrid sensors combining one or more technologies, such as combination chromatography-mass spectrometry sensors. These examples can also be incorporated with any one of or all of the embodiments of the invention described herein.

Examples of sensors and analysis techniques are further described in published U.S. Application No. 2004/0023419 A1, published on application Ser. No. 10/395,834, the contents of which are herein incorporated by reference in their entirety. By way of example, a controller 32 consistent with the present invention provides a filter system 5 with the ability to monitor filter performance in essentially real-time or in quasi real-time consistent with the relevant arts and to communicate acquired data with other devices by way of a communications network (shown in FIG. 6B). The controller 32 performs operations necessary to complete desired actions in response to processor 102 executing sequences of instructions contained in, for example, memory 104. Such instructions may be read into memory 104 from another computer-readable medium, such as a data storage device 108, or from another device via communication interface 118. Execution of the sequences of instructions contained in memory 104 causes processor 102 to perform a method for monitoring the performance of filters 18, 20. For example, processor 102 may execute instructions to perform the functions of determining the concentrations of particular contaminants trapped by filter 18.

Figure 6B:
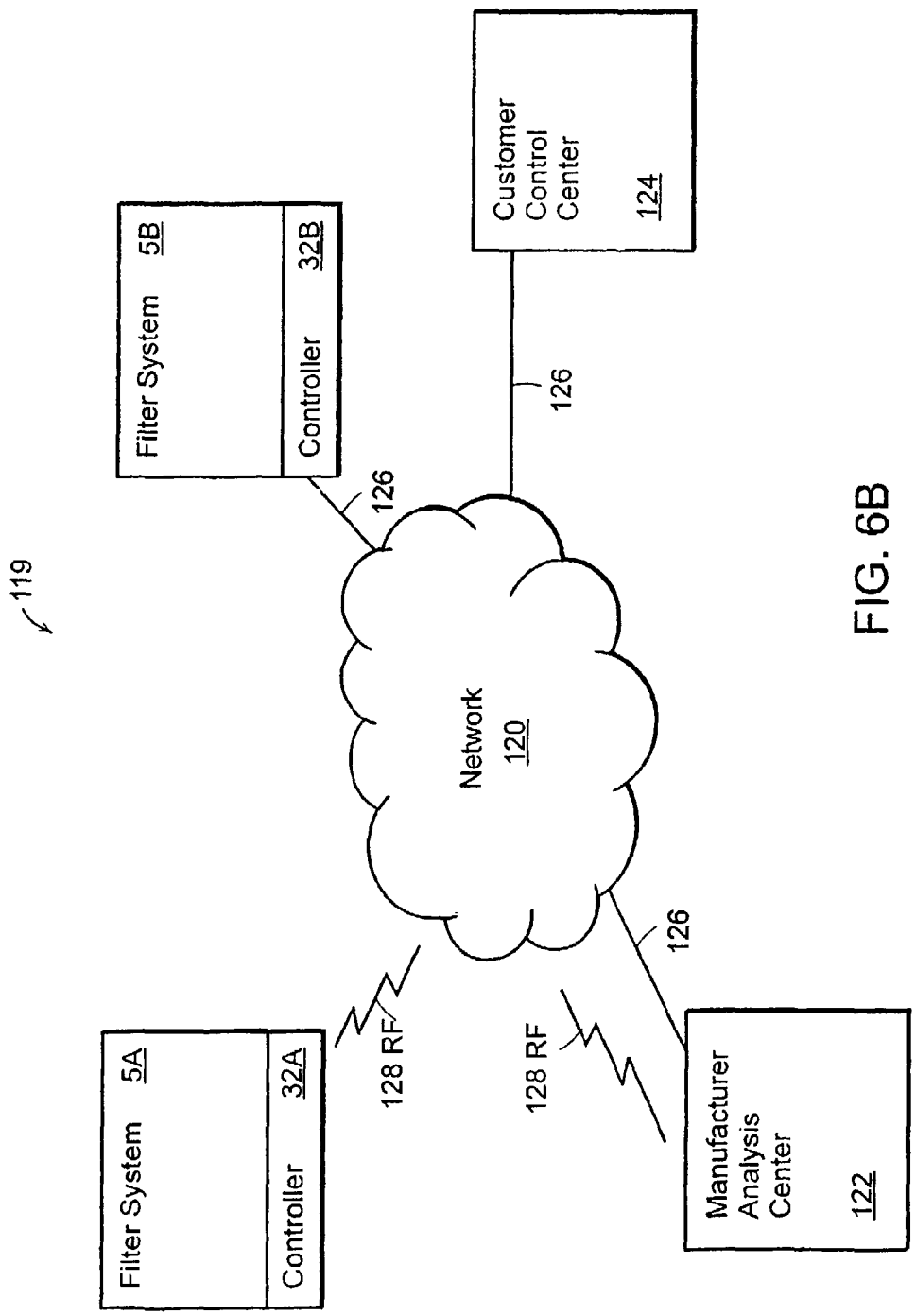
FIG. 6B illustrates an exemplary networked environment comprising filter systems, a network, a manufacturer analysis center and a customer control center.

Alternatively, hard-wired circuitry may be used in place of or in combination with software instructions to implement the present invention. Thus, the present invention is not limited to any specific combination of hardware circuitry and software. FIG. 6B illustrates a schematic view of filter system 5, including controller 32, operating in a networked environment. The system 119 comprises two filter systems 5A and 5B, respectively, each having a controller 32A and 32B, a network 120, a manufacturer analysis center 122 and a customer control center 124. Filter systems 5A and 5B operate in clean room environments to remove airborne contaminants. As the filter systems 5A, 5B operate, sensors 30 therein monitor each filter 18, 20 and report data to controllers 32A, 32B. The controller 32A, 32B are each communicatively coupled to a data network 120 by links 126, 128. Filter system 5A is coupled to network 120 by way of a wireless radio frequency (RF) connection such as a wireless Ethernet link, while filter system 5B is coupled to network 120 by way of a hardwired link 126. Hardwired links may be comprised of twisted pair copper conductors, coaxial cable, ribbon cable, multi-conductor transceiver cable, optical fiber or the like.

Manufacturer analysis center 122 may be operated by the manufacture of filter systems 5A, 5B and/or of filters 18 and 20. The manufacturer analysis center 122 may collect data from a plurality of systems and customers. Collected data may be used to design new products, to evaluate the performance of existing products or to improve the operation of existing products. For example, collected data may be used by a manufacturer to compute mean-time-between changes for its filters based on given contaminant loadings within a particular environment.

Data from filter systems 5A, 5B may also be conveyed to a customer control center 124. Here, a manufacturer analysis center 122 may support a plurality of customers, whereas the customer control center 124 collects data for its own use. Gathered data may be used to identify ill performing equipment. For example, if customer control center 124 determines that the concentration of a particular gas is increasing relative to concentrations of other contaminants, it may perform diagnoses to determine if the malfunction is associated with a particular machine operating within the monitored environment. Thus, timely remediation can be facilitated using the networked data. In addition, customer control center 124 can use collected data to monitor the overall performance of all of its clean rooms as well as to compute maintenance intervals based on current and accurate data. As seen in FIG. 6B, operating filter systems 5A, 5B in a networked environment provide many benefits in a cost effective manner.

Figure 7:
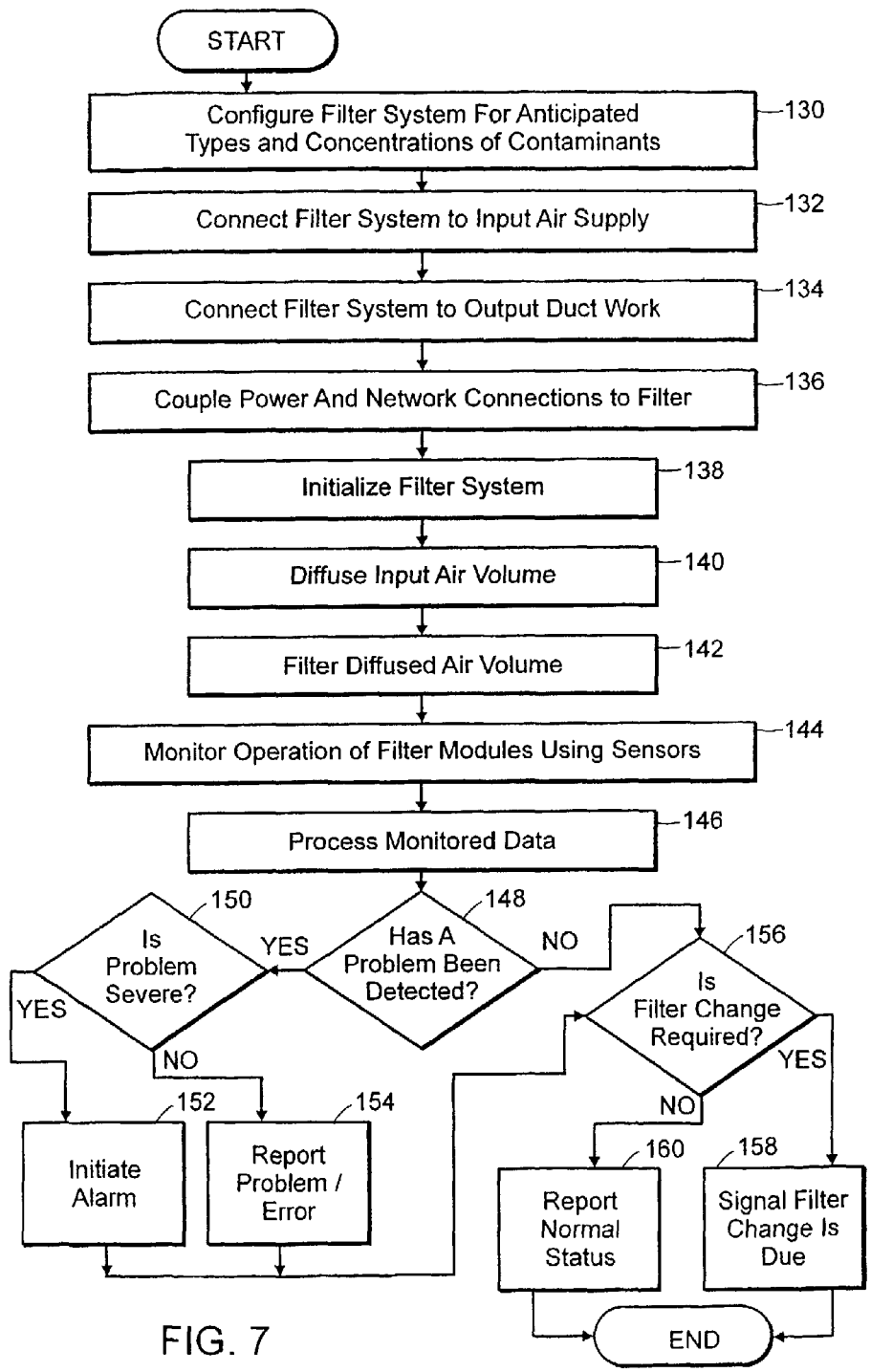
FIG. 7 illustrates an exemplary method for practicing embodiments of the invention.

FIG. 7 illustrates an exemplary method that is useful for practicing embodiments of the invention. Filter system 5 is configured for a particular clean room environment based on the types and concentrations of contaminants expected to be present therein (per step 130). Filter system 5 is then connected to an input air volume 12 using a plenum or the like (per step 132). Then filter system 5 is coupled to output duct work, if applicable (per step 134). Electrical power and input/output connections, such as network connections 126, 128 (link and RF, respectively) are coupled to filter system 5 (per step 136). The filter system 5 is then turned on and initialized as it begins operation (per step 138). An input air volume 12 is received and diffused using a flow controller 16 such as the diffuser plate having holes 82 disposed therethrough (per step 140). The diffused air volume 13 is filtered using a plurality of filters 18, 20 arranged in a series or parallel/matrix configuration (per step 142). Operation of filters 18, 20 as well as other operating parameters, e.g., air flow, air temperature, power consumption, error checking, etc., are monitored (per step 144). Acquired data may be processed while resident in filter system 5 using controller 32 (per step 146).

Note that the diffuser can be designed for particular filter system flow requirements using a software tool such as Cosmos Works. Based upon a selection of parameters including filter geometry and flow specifications, a diffuser panel having a fixed or variable hole size distribution and spacing can be selected and modeled for optimal performance. The diffuser plate is then made by drilling the holes in a metal plate in accordance with the selected hole distribution.

The method may next determine if a problem or error has been detected (per step 148). If a problem has been detected and determined to be severe (per step 150), then an alarm, either visual, audible, or both, may be activated to alert proper personnel (per step 152). In contrast, if a reported problem is not determined to be severe in step 150, the problem can be reported by way of conventional reporting channels and mechanisms in place at the clean room (per step 154). If no problem is detected at step 148, the method may determine if a filter change is required (per step 156). If a filter change is required, a signal may be sent to a display device, or by way of other reporting means known of and used in the arts, that one or more of the filters 18, 20 should be changed (per step 158).

In contrast, if a filter change is not required, or due, a normal operation status message may be displayed or otherwise indicated, e.g., by illuminating a green LED or the like (per step 160). Step 156 may also be executed after steps 152 and 154, respectively, if a problem has been encountered in step 148. The method of FIG. 7 may be executed in whole or in part at scheduled intervals using a timer, e.g., once per 24-hour period, or the method may be executed based upon events, e.g., each time filter system 5 is powered on.

The example herein are provided to illustrate advantages of the present invention that have not been previously described and to further assist a person of ordinary skill within the art with the making and using the embodiments described herein. The examples can include or incorporate any of the variations or embodiments of the invention described herein. For example, a sampling tube orifice of the invention may be incorporated into any of the systems, apparatuses described herein or other suitable system, apparatuses or devices as may be contemplated by those of ordinary skill in the art. The embodiments described herein may also include or incorporate the variations of any or all other embodiments of the invention. The following example is not intended in any way to otherwise limit the scope of the disclosure.

EXAMPLE

A study of the gas volumetric throughput through a sampling tube orifice of the invention was conducted. The study involved monitoring the volumetric flow of gas into the orifice and the corresponding flow from the orifice. The gas flow through the tube orifice can be measured by using standard equipment such as a volumetric flow meter. The volumetric throughput was measured for about 30 seconds. An average volumetric flow into the tube orifice and therethrough was obtained from a sample population of 61. The results of the study are provided in Table 1.

TABLE 1

| Sampling Tube Orifice | Minimum Volumetric Gas Flow (ft³ min⁻¹) | Average Volumetric Gas Flow (ft³ min⁻¹) | Maximum Volumetric Gas Flow (ft³ min⁻¹) |
|---|---|---|---|
| Input | 0.00429 | 0.00406 | 0.00389 |
| Output | 0.00394 | 0.00398 | 0.00400 |

Table 1 shows that a relatively low volume of gas flows through the tube orifice at a high velocity. The results in Table 1 also indicate that the volume of gas flow is consistent as minimum and maximum flow values do not substantially deviate from one another. Such consistency also suggests that gas flow within a sampling tube orifice is uniform. The gas flow into the tube orifice and from the orifice are shown by Table 1 to be nearly equivalent, indicating that gas volume is not retained or held in the orifice during use.

Figure 8:
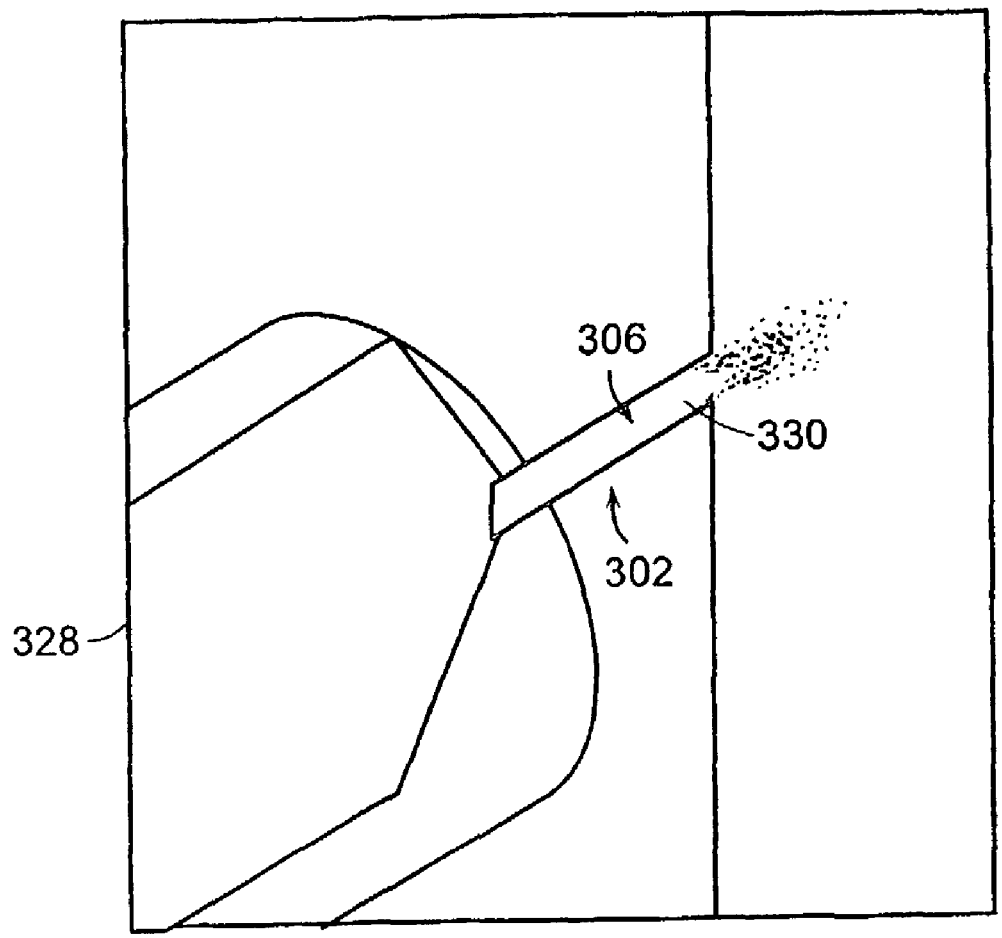
FIG. 8 is a perspective sectional of the sampling tube orifice of FIG. 2B during use.

The consistency and uniformity of gas flow through a tube orifice of the invention is also shown by FIG. 8. FIG. 8 is a schematic view of a sampling tube orifice 302 during use. The view is computer-based such that gas flow through the aperture 306 can be approximated. As shown, the velocity of gas flow in the orifice is within a range of about 5,000 to 8,500 feet per minute (ft min⁻¹). The gas flow velocity is also depicted so as to correlate with color. FIG. 8 shows the velocity of gas passing through the sampling tube orifice 302 is substantially uniform as it is characterized by a consistent color.

FIG. 8 also shows that gas flow through the aperture 306 of the tube orifice 302 is also characterized by a rapid flow rate acceleration after the gas sample is received at 328. FIG. 8 shows that the gas sample then promptly decelerates upon exiting the tube orifice at 330. The within FIG. 8 was also performed assuming that the tube orifice is substantially composed of a sapphire material. As described above, sapphire is particularly advantageous for the fabrication of a tube orifice of the invention as it is resistant to heat and can be precisely machine.

While the selective embodiments of the invention have been described herein, a person of ordinary skill in the art, after reading the foregoing specification, will be able to effect changes, substitutions of equivalents and other alterations to the embodiments as set forth herein. Each embodiment described above can also have included or incorporated therewith such variations as disclosed with regard to any or all of the other embodiments. For example, in a first alternative embodiment, filter system 5 may be configured to be mounted from a ceiling or on a roof top instead of being a free-standing unit as shown and described in conjunction with FIG. 2.

In a second alternative embodiment, a plurality of filter systems 5 may be joined in a series or parallel configuration to increase the level of filtration or to extend the time between filter changes. For example, the output from a first filter system may serve as the input to a second filter system to produce an in-series configuration. Or, an incoming air volume may be provided to a first filter system and a second filter system simultaneously to produce a parallel configuration.

In a third alternative embodiment, controller 32 may be comprised of a microphone and speaker for accepting user inputs and for providing outputs to a user. In this embodiment, controller 32 may use speech recognition software for interpreting spoken commands. Responses to user commands, or to provide alarm data, may be made available to a user by way of a speaker.

In a fourth alternative embodiment, controller 32 may be equipped with a wireless communication interface that allows filter system 5 to make data available to a cell phone, personal digital assistant, etc. so that an operator can remain informed about system operation.

In a fifth alternative embodiment, filter system 5 may be used to filter an incoming air supply to a residence or office building. If equipped with the proper type of filters 18, 20, filter system 5 may remove allergins and toxic airborne contaminants such as anthrax spores.

In a sixth alternative embodiment, the passive filters 18, 20 may be augmented with other contaminant removal or neutralization techniques such as ultraviolet light or electrical/static charges. Humidification means can also be employed with filter system 5 to maintain a specified moisture content within a clean room or other environment.

Therefore, all embodiments that come within the scope and spirit of the following claims and equivalents thereto are claimed as the invention. Moreover, the claims should not be read as limited to the described order or elements unless stated to that effect. It is therefore intended that protection granted by Letter Patent hereon be limited in breadth only by the definitions that are contained in the appended claims and any equivalents thereof.

What is claimed is:

1. A method for removing contaminants from a gas in a semiconductor processing device, said method comprising the steps of:
   receiving an input gas in an apparatus comprising a plurality of parallel filter stages disposed within an enclosure, said enclosure including at least one inlet and at least one outlet;
   passing said gas through a flow controller, disposed within the enclosure, before making said gas available to the plurality of filter stages, said flow controller including a first edge, and a second edge distal from the panel; and
   passing a portion of said gas through each member of said plurality of parallel filter stages to remove at least a portion of said contaminants,
   the flow controller comprising gas flow channels, said gas flow channels distributed between the first edge and the second edge so that gas flow channel sizes vary between the first edge to the second edge,
   wherein said flow controller delivers substantially equal volumes of said gas to each member of said plurality of filter stages.

2. The method of claim 1, wherein said flow controller comprises a diffuser plate.

3. The method of claim 2, wherein said apparatus is located in a clean room.

4. The method of claim 3, wherein said plurality of filter stages are arranged in a matrix having at least two rows and two columns.

5. The method of claim 3, wherein each member of said plurality of filter stages is comprised of a plurality of filter modules.

6. The method of claim 5, wherein said apparatus further comprises a plurality of sampling ports for sampling a like plurality of filter stages.

7. The method of claim 6, wherein said apparatus further comprises a detector communicatively coupled to said sampling ports.

8. The method of claim 7, wherein said apparatus further comprises an input sampling port for sampling at least a portion of said gas prior to reaching said plurality of filter stages and an output sampling port for sampling at least a portion of said gas after passing through said plurality of filter stages, said input and output sampling ports further being communicatively coupled to said detector.

9. The method of claim 8, wherein said apparatus further comprises a controller for monitoring operation of said apparatus.

10. The method of claim 9, wherein at least one member of said plurality of filter modules includes a physisorptive filter media.

11. The method of claim 9, wherein at least one member of said plurality of filter modules includes a chemisorptive filter media.

12. The method of claim 1, further including the step of regulating the flow controller to control output of the gas.

13. The method of claim 1, wherein:
the enclosure of the apparatus includes a panel comprising the at least one inlet and at least one outlet;
the first edge of the flow controller of the apparatus is a top edge, proximal to the panel and the second edge of the flow controller is a bottom edge distal from the panel; and
the gas flow channels of the flow controller of the apparatus being distributed between the top edge and the bottom edge so that gas flow channel sizes increases from the top edge to the bottom edge.

14. An apparatus for removing contaminants from a gas in a semiconductor processing device, the apparatus comprising:
an enclosure including at least one inlet and at least one outlet;
a plurality of parallel filter stages located within said enclosure for removing at least a portion of said contaminants from said gas flowing therethrough; and
a flow controller, disposed in the enclosure, for distributing said gas flow through said parallel filter stages, said flow controller having a first edge and a second edge;
the flow controller comprising gas flow channels, said gas flow channels distributed between the first edge and the second edge so that gas flow channel sizes vary between the first edge and the second edge,
said flow controller delivering substantially equal volumes of said gas to each member of said plurality of filter stages during a filtration process.

15. The apparatus of claim 14, wherein said flow controller is an active flow controller.

16. The apparatus of claim 14, wherein said flow controller comprises a diffuser plate.

17. The apparatus of claim 16, wherein said apparatus is an air filtration system.

18. The apparatus of claim 17, wherein each member of said plurality of filter stages is comprised of a plurality of filter modules.

19. The apparatus of claim 18, wherein said plurality of filter stages are arranged in a matrix having at least two rows and two columns.

20. The apparatus of claim 18, wherein said contaminants include amines.

21. The apparatus of claim 20, wherein each member of said plurality of filter stages contains a filter module having physisorptive filter media.

22. The apparatus of claim 20, wherein each member of said plurality of filter stages contains a filter module having chemisorptive filter media.

23. The apparatus of claim 22, wherein said chemisorptive filter media comprises an acidic material selected from the group consisting of sulfonated material and carboxylic functional group.

24. The apparatus of claim 14, wherein:
the flow controller comprises a diffuser plate having an input face for receiving said gas and an output face for delivering said gas to said plurality of filter stages, and wherein the gas flow channels are a plurality of holes.

25. The apparatus of claim 24, wherein at least a subset of said holes may be operable to be opened for allowing said gas to pass therethrough or may alternatively be closed to prevent said gas from passing therethrough.

26. The apparatus of claim 25, wherein said opening and said closing of said at least a subset of said holes is controlled by a controller.

27. The apparatus of claim 14, wherein each member of said plurality of parallel filter stages includes a plurality of filter modules.

28. The apparatus of claim 27, the apparatus further comprising an input sampling port for sampling said gas prior to passing through said plurality of filter stages, and an output sampling port for sampling said gas after passing at least substantially through said plurality of filter stages.

29. The apparatus of claim 28, the apparatus further comprising a detector communicatively associated with said plurality of sampling ports, said input sampling port and said output sampling port, each sampling port optionally using an aperture with a diameter to provide an outflow of gas.

30. The apparatus of claim 29, the apparatus further comprising a controller for controlling operation of said detector.

31. The apparatus of claim 30, wherein said contaminants include amines.

32. The apparatus of claim 30, wherein at least one member of said plurality of filter modules includes a physisorptive filter media.

33. The apparatus of claim 32, wherein said physisorptive filter media comprises activated carbon.

34. The apparatus of claim 30, wherein at least one member of said plurality of filter modules includes a chemisorptive filter media.

35. The apparatus of claim 34, wherein said chemisorptive filter media comprises an acidic material.

36. The apparatus of claim 35, wherein said acidic material comprises a sulfonated material.

37. The apparatus of claim 36, wherein said acidic material comprises a carboxylic functional group.

38. The apparatus of claim 28, wherein at least one sampling port is coupled to a concentrator that accumulates a contaminant.

39. The apparatus of claim 14, wherein the flow controller is regulated to control output of the gas.

40. The apparatus of claim 14, wherein:
the enclosure includes a panel, the panel including the at least one inlet and at least one outlet;
the first edge of the flow controller is a top edge proximal to the panel and the second edge of the flow controller is a bottom edge, distal from the panel; and
the gas flow channels of the flow controller being distributed between the top edge and the bottom edge so that gas flow channel sizes increase from the top edge to the bottom edge.

* * * * *

UNITED STATES PATENT AND TRADEMARK OFFICE
CERTIFICATE OF CORRECTION

PATENT NO. : 8,398,753 B2  Page 1 of 1
APPLICATION NO. : 11/628576
DATED : March 19, 2013
INVENTOR(S) : Sergi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this
First Day of September, 2015

Michelle K. Lee
*Director of the United States Patent and Trademark Office*